US008411149B2

(12) United States Patent
Maison et al.

(10) Patent No.: US 8,411,149 B2
(45) Date of Patent: Apr. 2, 2013

(54) METHOD AND DEVICE FOR IDENTIFYING AND EXTRACTING IMAGES OF MULTIPLE USERS, AND FOR RECOGNIZING USER GESTURES

(75) Inventors: Benoît Maison, Wavre (BE); Xavier Sohy, Falmignoul (BE)

(73) Assignee: Alterface S.A., Louvain-la-Neuve (BE)

( * ) Notice: Subject to any disclaimer, the term of this patent is extended or adjusted under 35 U.S.C. 154(b) by 745 days.

(21) Appl. No.: 12/309,800

(22) PCT Filed: Aug. 3, 2006

(86) PCT No.: PCT/EP2006/065054

§ 371 (c)(1),
(2), (4) Date: Jan. 30, 2009

(87) PCT Pub. No.: WO2008/014826

PCT Pub. Date: Feb. 7, 2008

(65) Prior Publication Data

US 2009/0244309 A1 Oct. 1, 2009

(51) Int. Cl.
*H04N 5/225* (2006.01)
(52) U.S. Cl. .................................................. 348/207.1
(58) Field of Classification Search .................. None
See application file for complete search history.

(56) References Cited

U.S. PATENT DOCUMENTS

| | | | | |
|---|---|---|---|---|
| 4,843,568 A | * | 6/1989 | Krueger et al. | 382/100 |
| 6,002,808 A | * | 12/1999 | Freeman | 382/288 |
| 6,256,033 B1 | * | 7/2001 | Nguyen | 715/863 |
| 6,556,704 B1 | * | 4/2003 | Chen | 382/154 |
| 6,674,877 B1 | * | 1/2004 | Jojic et al. | 382/103 |
| 6,681,031 B2 | * | 1/2004 | Cohen et al. | 382/103 |
| 6,692,259 B2 | * | 2/2004 | Kumar et al. | 434/307 A |
| 6,771,818 B1 | * | 8/2004 | Krumm et al. | 382/225 |
| 7,050,646 B2 | * | 5/2006 | Xu et al. | 382/254 |
| 7,274,800 B2 | * | 9/2007 | Nefian et al. | 382/103 |
| 7,663,689 B2 | * | 2/2010 | Marks | 348/370 |
| 2002/0041327 A1 | * | 4/2002 | Hildreth et al. | 348/42 |
| 2003/0038875 A1 | * | 2/2003 | Ivanov et al. | 348/43 |
| 2006/0029927 A1 | * | 2/2006 | Johnson et al. | 382/128 |
| 2007/0110298 A1 | * | 5/2007 | Graepel et al. | 382/154 |

* cited by examiner

*Primary Examiner* — Sinh Tran
*Assistant Examiner* — Jason Flohre
(74) *Attorney, Agent, or Firm* — Fisher Technology Law PLLC

(57) ABSTRACT

The invention relates to a method for identifying and extracting images of one or more users in an interactive environment comprising the steps of: —obtaining a depth map (7) of a scene in the form of an array of depth values, and an image (8) of said scene in the form of a corresponding array of pixel values, said depth map (7) and said image (8) being registered; applying a coordinate transformation to said depth map (7) and said image (8) for obtaining a corresponding array (15) containing the 3D positions in a real-world coordinates system and pixel values points; —grouping said points according to their relative positions, by using a clustering process (18) so that each group contains points that are in the same region of space and correspond to a user location (19); —defining individual volumes of interest (20) each corresponding to one of said user locations (19); —selecting, from said array (15) containing the 3D positions and pixel values, the points located in said volumes of interest for obtaining segmentation masks (35) for each user; —applying said segmentation masks (35) to said image (8) for extracting images of said users. The invention also relates to a method for recognizing gestures of said users.

2 Claims, 16 Drawing Sheets

METHOD AND DEVICE FOR IDENTIFYING AND EXTRACTING IMAGES OF MULTIPLE USERS, AND FOR RECOGNIZING USER GESTURES

TECHNICAL FIELD

The invention relates to the field of interactive multimedia applications. More particularly, it relates to a method and a device for identifying, tracking, and extracting images of multiple users, as well as for recognizing the arms, hands and whole-body gestures of multiple users, in order to interact with a computer system.

DESCRIPTION OF RELATED ART

Nowadays, multimedia and virtual reality applications permit several and different interactions between a computer system and a user, and, as a consequence, require input devices with additional features. Traditionally, common desktop input devices, such as keyboards and mice, or specialized devices like trackballs, touch pads, joysticks and game pads, are firmly established as the classical means of interaction between a person and a computer system. Ideally, in particular applications, computer user interfaces should have on the one hand an intuitive interaction format, and on the other hand a large range of interaction capabilities. All the traditional devices fail to combine the above features. For example, a common computer keyboard has large range of interaction capabilities, but has not an intuitive interaction format. Vice versa, a common computer mouse has an intuitive interaction format, but has not a large range of interaction capabilities. Moreover, all these devices are frequently realized for contexts of single users and contexts wherein the human-computer interaction is reduced.

In some domains, as virtual reality, the traditional input devices suffer from unacceptable drawbacks, for example:
  users are bound to the location of the keyboard and mouse, or other device;
  keyboards and mice do not work well for controlling games, or other highly interactive applications, and even game pads only support a limited form of user interaction.

In computer graphics today, there is a soaring necessity for alternative solutions that could overcome the above limitations, as well as provide additional functionalities and advantages as:
  permitting users to freely move during interaction with the computer system;
  allowing multiple users to compete or to collaborate in groupware collaborative systems;
  interacting and experiencing without wearing special, obtrusive, or expensive instrumentation;
  permitting whole body interactions for richer, more natural control;
  distinguishing between the participants and the audience;

Some existing techniques use video cameras for recording the image of the users in order to provide input to the computer system, and sometimes include the image of the users in a graphical output generated by the computer system. Included among these techniques there are for example: U.S. Pat. No. 4,843,568 (Krueger et al.) which discloses a technique for allowing a real time perception and response to the actions of a single participant/user; U.S. Pat. No. 5,534,917 (MacDougall) which discloses a Video Image Based Control System. However, all these methods require the user to be in a precise location in front of the camera, with no other moving object, and in particular no spectator, in the field of view of said camera. Moreover, in order to distinguish the image of the user, a specially designed background must be additionally placed behind the users for image segmentation.

Segmentation based only on the color image information is a common technique in computer vision for separating foreground from the background. The most naive approach consists in storing an image of the background as a reference image, while a foreground object is segmented by a simple subtraction of this background reference from the current image. This simple technique is often used for post-production incrustation when the background is constant (commonly a uniform green or blue color) in perfectly controlled lighting conditions. Nevertheless, this approach suffers from problems, especially in natural lighting or when the objects to be segmented produce shadows on the floor or the background.

Other systems make use of devices that must be worn by the user (for example, the data glove: Joseph Laviola, "Flex and Pinch: A Case Study Of Whole Hand Input Design For Virtual Environment Interaction", Proc IASTED, pp. 221-225, 1999), or special markers (like light-emitting diodes) attached to the body of the subject for limb tracking and gesture recognition, or pressure sensitive switches in the floor, to detect position of users. However, the pure scope of these techniques is limited to highly specialized applications and to dedicated users, and is too intrusive and cumbersome for the general public and generic applications.

No solution exists so far that allows multiple unencumbered users to move freely and together interact with a computer system in real-time.

PRIOR ART DISCUSSION

The document U.S. Pat. No. 5,534,917 describes a video image based control system that allows a participant to interact with a computer based environment. This document provides a technique for creating areas of interest in the two-dimensional image wherein a participant interacts. Nevertheless, this apparatus does not permit a multiple user interaction, cannot recognize the gestures of a participant and cannot detect or track any part of the body of said participant. Moreover, it does not separate the image of a participant from the background image or from the image of the audience.

The document U.S. Pat. No. 6,661,918 discloses a method and a system for distinguishing between background and foreground objects in a sequence of video images, as well as for identifying these objects. This document provides a technique in which one creates a depth map and an intensity map (e.g. luminance, gray scale, UV chrominance value, etc ....) by using a pair of digital video cameras. Depth and intensity values of a pixel in successive images are represented in a histogram and clustered for determining a background model. However, this apparatus does not recognize the body pose and users gestures, and does not track parts of the body. Moreover, it does not locate users in a two-dimension nor three-dimension space, and does not distinguish between several users, and between a participant and the audience.

The document U.S. Pat. No. 6,950,123 discloses a method and a system for tracking simultaneously multiple objects in a sequence of video frames by means of multiple cameras. This document provides a technique for extracting a region of interest (ROI) corresponding to a portion of a playing field. This region represents the foreground image which is separated from the background image. By means of different filters and a Monte Carlo technique, the apparatus tracks and segments all the objects and resolves all conflicts to estimate the objects positions. Nevertheless, it cannot recognize the body poses of users or the gestures of the users; and cannot track or detect any part of the body. Although the apparatus comprises several cameras, they have different fields of view, and it does not compute a depth map. As a consequence, the method assumes that the users move on a flat surface relatively far and below the camera in order to infer the three-dimensional position of the users. Lacking dense depth information, the system is not able to separate the images of different users, or distinguish between the participants and the audience, when they are on the same line of sight from the camera.

The document U.S. Pat. No. 6,181,343 describes a system and method for permitting three-dimensional navigation through a virtual reality by using camera-based gesture inputs of a single user. It processes the apparent distances in two-dimensional images to infer three-dimensional position to the user. Nevertheless, this approach has several drawbacks and limitations as follows: the apparatus relies on a fixed background and hence it cannot be used if there are moving objects or variable lighting behind the user; it cannot be used for several users if they are in the same line of sight from the camera(s). Furthermore, the system relies on biometric data and determination of the silhouettes in order to infer positions from apparent lengths of the limbs measured in the image. That can be very inaccurate as biometric data are only averages, and individual data can vary greatly; it may also not work if users wear loose clothing or carry items. The technique assumes that users' feet are on the floor to determine the three-dimensional location of the users. That will not work if users jump, for example when playing a game; if users' feet are not detected accurately in the image, for example because of shadows on the floor; or for more complex floors, for example not flat, with stairs or several levels, etc . . . .

The document U.S. Pat. No. 7,003,134 discloses a method for estimating the three-dimensional position and orientation of an object. The apparatus provides a technique for estimating pose of an object by using depth data at real-time rates. However, the document does not disclose any apparatus for identifying, tracking and extracting the image of multiple users, or for separating the participants from the audience, or for recognizing gestures of users.

The document U.S. Pat. No. 7,003,136 discloses a method for estimating the three-dimensional position and orientation of an object. A three-dimensional point cloud is obtained from a time series of video frames and representing selected image pixels in a three-dimensional coordinate system spanned by a ground plane and a vertical axis. The three-dimensional point cloud is portioned into a set of vertically-oriented bins for producing "plan-view images". The objects are tracked based upon said plan-view images. Nevertheless, this document does not disclose any apparatus for identifying, tracking and extracting the image of multiple users, or for separating the participants from the audience. Moreover, no means for recognizing gestures of users are provided.

U.S. Pat. Application No 2002/0041327A1 discloses a method for interfacing a computer system by using stereo vision. The apparatus captures and processes a stereo image for determining position information of an object held by a user. Each time a user moves an object into (or reaches with his hands) a fixed region of interest, the apparatus establishes the object's position by computing a depth map. Nevertheless, the technique, herein described, fails to identify, track and extract the image of multiple users when they do not stay at a pre-determined location. Moreover, it does not tolerate any other moving objects in the region of interest.

The document WO06022685A1 describes a system and method for providing a functional virtual environment with real time extracted and transplanted images. The document mentions a method for extracting a foreground image from a background environment by using non-monochromatic, fixed background against which the users' images can be extracted. Nevertheless, the apparatus does not provide any technique for extracting the user image if there are moving objects or persons behind the user, and in general if there is not a fixed background. Moreover, the apparatus herein described does not recognize gestures, body pose of users and does not detect and track any body part of the participants.

It is an object of the present invention to provide a method and a device for identifying, tracking and extracting images of multiple users as well as recognizing the gestures and the objects of multi users in the scene of a groupware interactive environment, which aims to overcome the above discussed disadvantages of the prior art.

SUMMARY OF THE INVENTION

According to a first aspect of the invention, a method is provided for identifying and extracting images of one or more users in an interactive environment. The method comprises the steps of:
  obtaining a depth map of a scene in the form of an array of depth values, and an image of said scene in the form of a corresponding array of pixel values, said depth map and said image being registered;
  applying a coordinate transformation to said depth map and said image for obtaining a corresponding array containing the 3D positions in a real-world coordinates system and pixel values points (pixel values may either be colour or grey level);
  grouping said points according to their relative positions, by using a clustering process so that each group contains points that are in the same region of space and correspond to a user location;
  defining individual volumes of interest each corresponding to one of said user locations (these individual volumes of interest may be fixed, and predefined);
  selecting, from said array containing the 3D positions and pixel values, the points located in said volumes of interest for obtaining segmentation masks for each user;
  and applying said segmentation masks to said image for extracting images of said users.

In a preferred embodiment of the method, the individual volumes of interest may be obtained by determining individual volumes of interest bounds separating said groups. These volumes of interest may vary according to user movements, and thereby be adaptive.

One may use said segmentation masks of said users for modifying existing elements or inserting virtual elements in said scene, and projecting an image showing these elements, and providing thereby a "magic mirror"

The method may comprise a registration process comprising the steps of:
  performing a calibration process for obtaining calibration parameters comprising the relative position of a depth perception device and a video camera, the focal length and optical centres of said depth perception device and said video camera;
  obtaining a raw depth array from said depth perception device;
  obtaining a raw pixel values array from said video camera;

computing the 3D coordinates for each element of said raw depth array, from the depth value itself, from the array indices of the element, and from the relevant calibration parameters of the devices;

computing the array indices where said 3D coordinates point is projected in the image;

repeating this process for each element of the raw depth array, for providing a depth map and image of the scene, said depth map and said image being registered.

Registered depth map and image have same size (same number of pixels). More particularly, a pixel of the registered color pixel array and the corresponding pixel of the registered depth array correspond to the same physical scene element.

The method may also comprise a depth map refinement process. This process is desired when the depth map comprises gaps, where no depth value is available. This process may comprise the steps of:

scanning said depth map row by row by executing a row interpolation comprising the steps of:
identifying gaps in the depth map where no value of depth is provided;
if a gap is shorter than a preset threshold, and if the depth difference between the two sides of the gap is smaller than a preset threshold, and if the pixel values difference of the corresponding pixels in the image is smaller than a preset threshold, then the gap in the depth map is filled with depth values, said depth values being the average of the depths at each side of the gap or values which are linearly interpolated between these values;

optionally scanning said depth map column by column and executing a column interpolation similar to said row interpolation;

optionally performing a second row interpolation.

The method may additionally comprise a mask filling process comprising one or more of the following steps:

performing a morphological dilation step (this is done most effectively by repeating a "one-pixel dilation" D times, where D is the desired total size of the dilation);

performing a median filtering step (this step is executed for further smoothing the edges of each individual mask and removing very small holes and/or small disconnected segmented regions. The size M of the median filtering window can be adjusted depending on the characteristics of the depth perception method);

filling small holes in the individual masks;

removing small objects in the individual mask;

performing a morphological erosion process of a preset size; for obtaining filled masks.

The method may comprise an optional background segmentation process for separating foreground objects from background objects. The background segmentation process may comprise the steps of:

obtaining successive images of said scene;

detecting motion of objects in said scene by subtracting two successive images and performing a thresholding;

computing a colour mean array containing for each pixel a mean value $\mu$ and a colour variance array containing for each pixel a variance var from corresponding pixel of said successive images of said scene;

determining pixels of said images that change between successive images;

masking the pixels that did not change for updating said colour mean array and colour variance array;

determining a background model from said colour mean array and colour variance array;

deciding that a pixel is part of the background if its pixel value x meets the condition $$(x-\mu)2 < \beta^* \text{var}$$

where $\beta$ is a variable threshold;

determining a background-based segmentation mask by selecting all pixels in image that do not meet above criteria.

When using background segmentation the method of the invention may detect and treat the shadows on the background of an image. This process may comprise the steps of:

dividing said image in non-overlapping rectangular blocks;

for each block, repeating the following steps:

extracting all pairs (x,y) of corresponding pixel values from said colour mean array and said image;

computing a monotone regression y=f(x), such as a linear regression y=ax+b with correlation coefficient $\rho$;

using parameters of said regression (a, b, $\rho$, or others) to classify a block as a background or a foreground block, e.g. if $\rho$<threshold then block is a foreground block;

if block is classified as a background block, adapting mean array values using regression parameters, e.g. $\mu'=a\mu+b$ if block is classified as foreground block but is neighbour of a block classified as a background block, optionally performing the preceding adapting step using regression parameters a, b of said neighbour block;

deciding that a pixel is part of the background if its pixel value x meets the condition $$(x-\mu') 2 < \beta^* \text{var}$$

where $\beta$ is a variable threshold;

The method may also comprise a multiple step erosion process for improving a filled mask. This process may comprise the steps of:

detecting video image edges from said image, by using said background-based segmentation mask for obtaining an "edge" map;

repeating the following two steps A times, where A is a preset parameter, t is the iteration counter, and mask(0) being the filled mask:

performing a one-pixel erosion step on said filled mask "mask(t−1)" for obtaining a one-pixel eroded mask "mask_e(t)";

performing an edge restoration process for correcting said one-pixel eroded mask and obtaining an edge-restored mask "mask(t)";

performing a final one-pixel erosion step on said edge-restored mask "mask(t)" for obtaining a final eroded mask;

combining the background-based segmentation mask and said final eroded mask via a logical AND operation in order to obtain a final mask.

Said multiple step erosion may comprises the step of performing the logical operation:

$$\text{mask}(t) = \text{mask\_}e(t) \text{ OR } ((\text{NOT mask\_}e(t)) \text{ AND mask}(t-1) \text{ AND edge}).$$

Alternatively, said multiple step erosion may comprises the steps of:

computing masks Eb and Nb, for each successive execution of the edge restoration process (23*b*), according to $$E_b = \text{mask\_}e(t) \text{ OR } ((\text{NOT mask\_}e(t)) \text{ AND mask}(t-1))$$

$$N_b = \text{mask\_}e(t) \text{ OR } ((\text{NOT mask\_}e(t)) \text{ AND mask}(t-1) \text{ AND edge});$$

dividing masks Eb and Nb in blocks i having a preset size;
at each successive execution, and for each block of masks Eb and Nb, counting the number of pixels equal to '1', for obtaining the numbers $\Sigma Eb_i(t)$ and $\Sigma Nb_i(t)$, respectively;
for each block i, compare the numbers $\Sigma Eb_i(t)$ and $\Sigma Nb_i(t)$ and their ratio to the values computed at the previous iterations $\Sigma Eb_i(t-1)$ and $\Sigma Nb_i(t-1)$;
stopping the edge restoration process for block i when said ratio approaches '1' within a preset margin.

The method preferably comprises a process for recognizing a gesture of one of said users. Said process may comprise the following steps:
dividing the individual volume of interest of said user in small elementary volumes of pre-determined size;
allocating each pixel of the mask of said user to the elementary volume wherein it is located;
counting the number of pixels within each elementary volume, and selecting the elementary volumes containing at least one pixel;
determining the centres of said selected elementary volumes, said centres being either the geometric centre or centre of gravity of the pixels within said elementary volumes;
performing a graph construction step, wherein each centre of said selected elementary volumes is a node, edges linking two nodes n, m are given a weight w(n,m) equal to the Euclidian distance between the centres of said nodes;
performing a centre estimation step, wherein an elementary volume is determined that is closest to the centre of gravity of all pixels is named "source cube" and the corresponding node in the graph is named the "source node";
computing a curvilinear distance D(v) from the source node to all nodes v that are connected to it;
performing an extremity detection step by checking for all nodes u, whether D(u) is greater or equal to D(v) for all nodes v connected to u, and if it is the case, marking node u as an extremity node;
performing a body part labelling step for obtaining the locations of body parts comprising head, hands, feet, by allocating body parts to extremity nodes using rules;
determining a sequence of body parts locations, by performing the above steps on successive depth maps and images of the scene;
performing a tracking of said body parts, and
performing gesture recognition step by using a hidden Markov model method.

In the process of gesture recognition, the computation of a curvilinear distance D(v) may be performed by using a modified Dijkstra's algorithm wherein the computation of a best weight W(n) for a node n is performed by adding the weight w(n,n−1) of the edge linking nodes n and n−1, raised to a power ρ, to the weight W(n−1) of a preceding node n−1, p being an integer larger than 1.

According to a second aspect of the invention, a device is provided for identifying and extracting images of multiple users in an interactive environment scene comprising:
a video camera for capturing an image from the scene;
a depth perception devices for providing depth information about said scene;
at least one computer processor for processing said depth information and said image information;
wherein means are provided for using individual volumes of interest from said scene for each user.

In a preferred embodiment, the device comprises means for obtaining adaptive volumes of interest for each user. By "adaptative" one must understand that said volumes of interest are determined dynamically, and follow the movements of the users.

The device preferably comprises:
means for dividing the individual volume of interest of said user in small elementary volumes of pre-determined size;
means for allocating each pixel of the mask of said user to the elementary volume wherein it is located;
means for counting the number of pixels within each elementary volume, and selecting the elementary volumes containing at least one pixel;
means for determining the centres of said selected elementary volumes, said centres being either the geometric centre or centre of gravity of the pixels within said elementary volumes;
means for performing a graph construction step, wherein each centre of said selected elementary volumes is a node, edges linking two nodes n, m are given a weight w(n,m) equal to the Euclidian distance between the centres of said nodes;
means for performing a centre estimation step, wherein an elementary volume is determined that is closest to the centre of gravity of all pixels is named "source cube" and the corresponding node in the graph is named the "source node";
means for computing a curvilinear distance D(v) from the source node to all nodes v that are connected to it;
means for performing an extremity detection step by checking for all nodes u, whether D(u) is greater or equal to D(v) for all nodes v connected to u, and if it is the case, marking node u as an extremity node;
means for performing a body part labelling step for obtaining the locations of body parts comprising head, hands, feet, by allocating body parts to extremity nodes using rules;
means for determining a sequence of body parts locations, by performing the above steps on successive depth maps and images of the scene;
means for performing a tracking of said body parts;
means for performing gesture recognition step by using a hidden Markov model method.

All these means are components of a software residing in said computer.

According to a third aspect, the invention covers the use of a method according to the invention and/or a device according to the invention for providing an interactive virtual reality game wherein images of a plurality of users are separated from each other and from a background.

Preferably, gestures and/or body poses of individual users are recognized and used for controlling said game.

Images or partial images of the users may be shown in a virtual-game world

One can determine the location of a user and use said location for directing one or more light beams.

Users may be directed to catch or to escape one of said light beams.

Users may also be directed to point at each other or to give each other virtual objects or to point at each other to establish links between them in the game.

An avatar in a virtual reality may replicate a gesture or a visual characteristic of a user such as clothes colors, hair color, skin color.

Real-world elements may react to user locations and gestures by floor shifts, animatronics figures move and talk, etc.

The device and method of the invention may be used for performing or for buying/selling items in a virtual marketplace.

According to a last aspect of the invention, one or more computer-readable media having stored thereon a computer program for performing the method and/or for using the device of the invention.

DETAILED DESCRIPTION OF THE INVENTION

Figure 1:
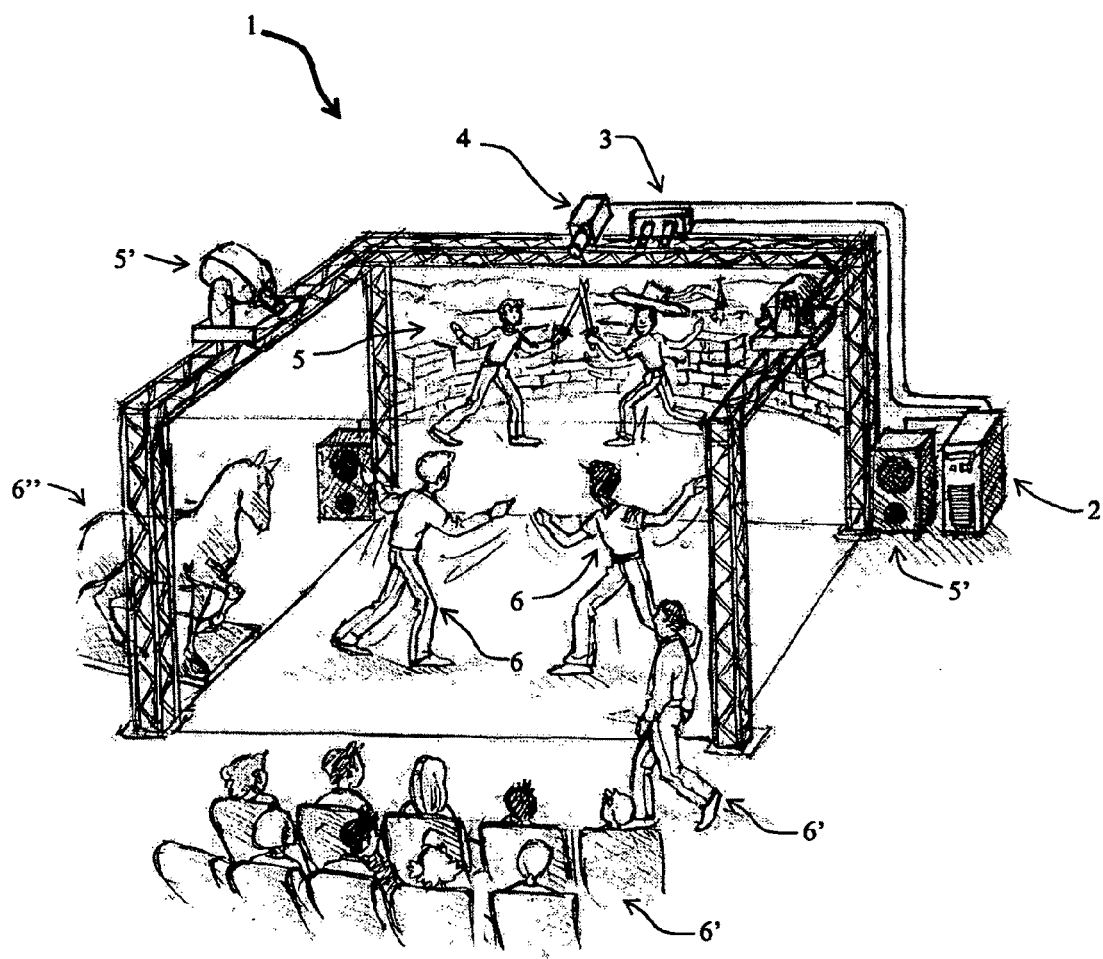
FIG. 1 is a pictorial representation of a device according to the invention.

According to a preferred embodiment, FIG. 1 shows a pictorial representation of a device according to the invention. The apparatus 1 comprises a computer system 2; a depth perception device 3 connected to the computer system 2; a video camera 4 (or stereoscopic or tri-focal cameras that serve both purposes) also connected to said computer system 2; a computer-controlled display 5 such as projection, flat screen or other; a variety of computer-connected output devices 5', such as light projection systems, loudspeakers, displays etc . . . , for providing rich audio-visual feedback in order to react to the location and the movements and gestures of all the users 6, 6' in a scene. The depth perception device 3 may be, for example, a stereoscopic camera (see e.g. D. Scharstein and R. Szeliski.: "A Taxonomy and Evaluation of Dense Two-Frame Stereo Correspondence Algorithms" IJCV 47(1/2/3):7-42, April-June 2002., for a survey of stereo vision technology); or a laser or infrared range sensor (see http://www.swissranger.ch/: for an example of a commercial product, and the paper: J W Weingarten, G Gruener, R Siegwart, A state-of-the-art 3D sensor for robot navigation, Proceedings Intelligent Robots and Systems, 2004); or other. Optionally, the video camera 4 may be a stereoscopic camera or a tri-focal camera, and in this case it can replace the depth perception device 3 and function as both. A global region of interest can be defined for automatically distinguishing the participants 6 from the spectators 6' and from other objects 6", even if they are all in the field of view of the cameras 4, without using any physical opaque separator. The present invention can also comprise loudspeakers and other computer-controlled devices and sensors (spotlights and gobos, smoke screens, buttons, joysticks, game controllers, wheels, musical instruments, etc.).

It should be noted that not all types of devices may be part of each given setup. For example, in a variant of this preferred embodiment the physical setup may comprise a stereoscopic camera and a display, or, alternatively, in another variant of the said embodiment it may comprise a depth perception sensor and a computer-controlled gobo. The physical setups, according to the invention, can also be located indoors or outdoors. Alternatively, the area covered by the cameras and sensors (the scene) can be empty (except for the active users of the system), or occupied by furniture, props, natural elements or other unrelated objects.

The depth perception device 3 and the video camera 4 provide the computer system 2 with raw data about the content of the scene. In particular, the depth perception device 3 provides a map of distances (depth map) in the form of a depth array 7; and the video camera 4 provides a color pixel array 8. All these data are processed and used to choose and/or drive the output of the computer-controlled devices 5'.

It should be noted that the depth information is used for several, independent, non-exclusive, purposes as follows:
- to locate and track the users 6, 6' in the scene;
- to locate objects 6" in the scene (and track them if they are mobile, e.g. a mobile robot), objects that users manipulate, or objects that are part of the interactive setup;
- to determine the general body pose (e.g. standing, sitting, lying down, etc.) of the users 6;
- to recognize hand or whole body gestures (e.g. pointing, grabbing, throwing, kicking, jumping, leaning, etc.) made by users 6;
- to separate (segment) and discriminate, in the video streams provided by the cameras 4, the image of each user 6 from the background scene. If the image of a user 6 is partly occluded, only the visible part is segmented, and the nature of that part (e.g. the head and shoulders) is identified;
- to identify and label the various body parts and clothing items (e.g. head, arms, hands, legs, hats, shoes, etc . . . ) in the images of the users 6.

Figure 1A:
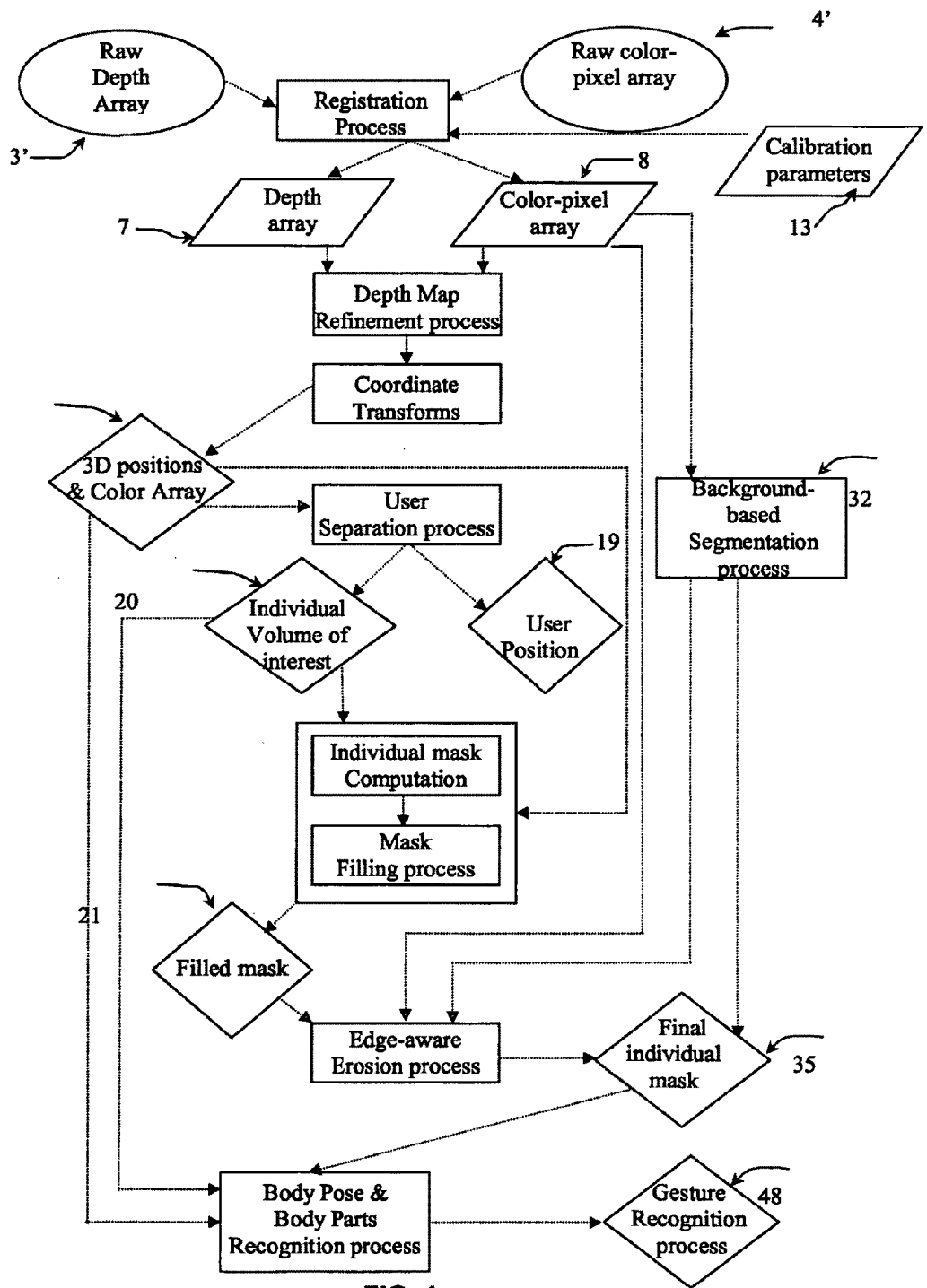
FIG. 1a is a general flowchart diagram of a method according to the invention.

FIG. 1a shows a flowchart of a preferred embodiment according to the invention. The depth perception device 3 and the video camera 4, which are previously synchronized, provide the computer system 2 with a raw depth array 3' and with a raw color pixel array 4', respectively. Typically, those arrays are not corresponding in size and array elements depending on the relative position of devices and so on. Therefore, with a registration process, which uses some devices parameters, the system transforms said two acquired raw arrays 3' and 4' into a registered depth array 7 and color-pixel array 8 i.e. arrays having same sizes (number or rows and columns), and where corresponding pixels relate to a given scene element. Due to depth perception device technical limitations, it frequently happens that missing parts or errors appear in the depth map. These missing parts or errors are repaired by using a depth array refinement process. Afterwards, by applying a coordinate transform to the two arrays, the system computes a 3D positions and color points array 15 (a array wherein corresponding elements contain the 3D coordinates X, Y, Z associated with a color or other pixel value). Once said 3D position and color points array 15 is established, it is used for performing a user separation process which provides users positions 19 and individual volume of interest 20 for each participant 6. By using an individual mask computation process and a mask filling process, the system establishes, from the individual volumes of interest 20 and from the 3D position and color points array 15, a filled mask 21 for each user. The latter, due to the filling process, may be wider than the actual image of the user. In order to adjust the dimensions of this filled mask 21, an erosion process, in combination with a background-based segmentation process 32, is then performed. Finally, by means of the logical operator AND, the system provides a final individual mask 35 for each user 6 in the scene. The final individual mask 35, the individual volume of interest 20 and the 3D position and color points array 15 are taken as input for the body pose and body parts recognition and tracking process, as well as for the gesture recognition process.

Figure 2:
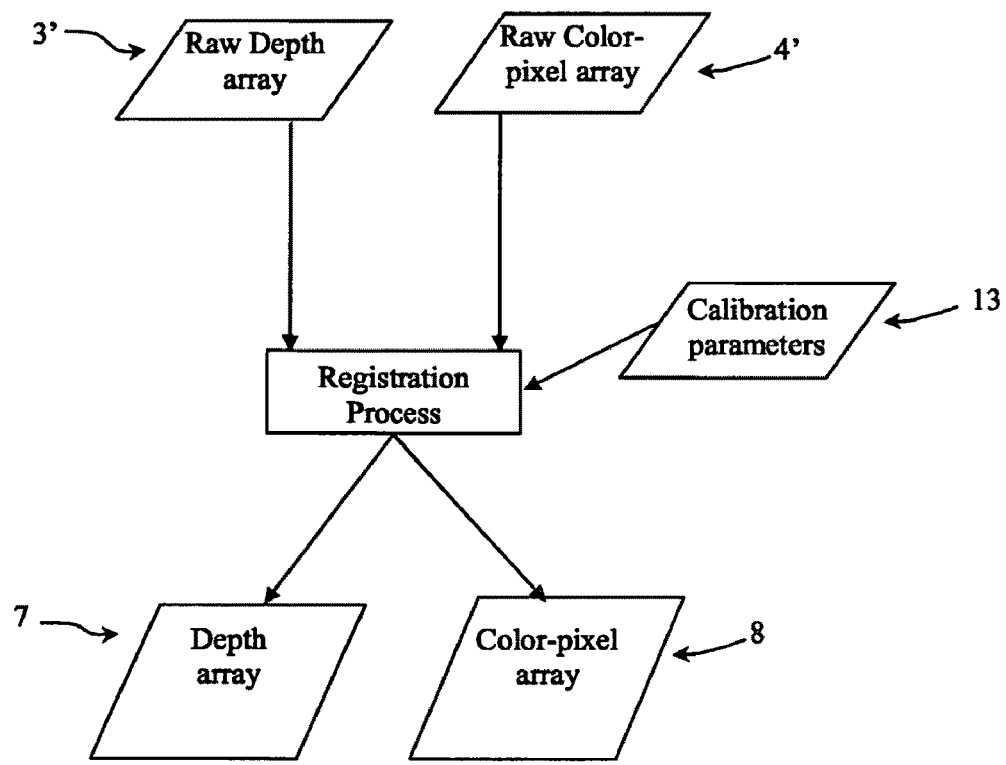
FIGS. 2, 3, 4, 5, 5b, 6a, 7, 8 and 9 are detailed flowchart diagrams of parts of a method according to the invention.

We refer now to FIG. 2. The depth perception devices 3 provide a raw depth values array 3' corresponding to different lines of sight originating at said depth perception device 3; and the video camera 4 provides an image acquisition in the form of a raw color pixel array 4'. If, optionally, the depth perception device 3 is a stereoscopic or a tri-ocular video camera, then the depth map corresponds to the pixels of the image provided by one of the image sensors. Therefore, in that case, the apparatus knows the depth values of each object corresponding to each pixel of the image. A synchronization process is performed by controlling the different devices with a common external trigger in such a way that all data are captured by all devices at the same moment. As above introduced, registration establishes a correspondence between the raw color pixel array 4' provided by the camera 4, and the raw depth array 3' provided by the depth perception device 3. More precisely registration establishes a correspondence between the elements of each array. The registration action can be executed by a two-step process as follows:

1. The first one is the calibration step which is performed only once, off-line, after the video camera 4 and the depth perception device 3 have been positioned. It consists in placing an object of known shape and dimensions (like a cube or a rectangular pane with a printed checkerboard pattern) in front of both devices 3, 4. The known object can either be placed once in the scene, or can be moved to various locations. For each location of the calibration object, one image and one depth map are captured simultaneously by the depth perception device 3 and the video camera 4. By locating the features of the object (like edges or corners) in both the image and the depth map (or the sequence of images and depth maps), several calibration parameters 13 are stored. Those parameters comprise:
   the relative position of the two devices 3 and 4 expressed by a rotation matrix and a translation vector;
   the focal length and optical center of the two devices 3 and 4;
   the image distortion (relative to the ideal pinhole model) introduced by the video camera 4;
   other parameters describing the operation of the depth perception device 3.
   The calibration step is very similar in principle to the calibration of stereoscopic imaging devices. However, an important difference is that, in the present case, the two devices 3 and 4 are not identical; in fact they operate very differently, and do not produce at all the same kind of data. The video camera 4 produces an array of pixels, while the depth perception device 3 produces an array of depth measurements.
2. The second step of the registration uses the calibration parameters 13 computed during the calibration step in order to register the content of each new pair of color pixel array 4' and depth array 3' at run time. For each element of the raw depth array 3', the 3D coordinates of the real-world point that gave rise to that measurement are computed. Said coordinates are calculated from the depth value itself, from the array indices of the element, and from the relevant calibration parameters of the devices which have been obtained during the first step of the registration (for example, a pseudo optical center and a pseudo focal length). Subsequently, coordinate transforms (rotation and translation) are applied to the coordinates of the same real-world point in the coordinate system of the video camera 4. Finally, the parameters of the video camera 4, such as focal length, optical center, distortion parameters, baseline, rectification parameters or other . . . , are used to compute the coordinate wherein said real-world point is projected in the image. By repeating this process for each element of the raw depth array 3', the apparatus establishes correspondences between the entire depth array 3' and the color pixel array 4'. This process provides a registered depth array 7 and a registered color pixel array 8 which have the same size. More particularly, a pixel of the registered color pixel array 7 and the corresponding pixel of the registered depth array 8, correspond to the same physical scene element.

Figure 3:
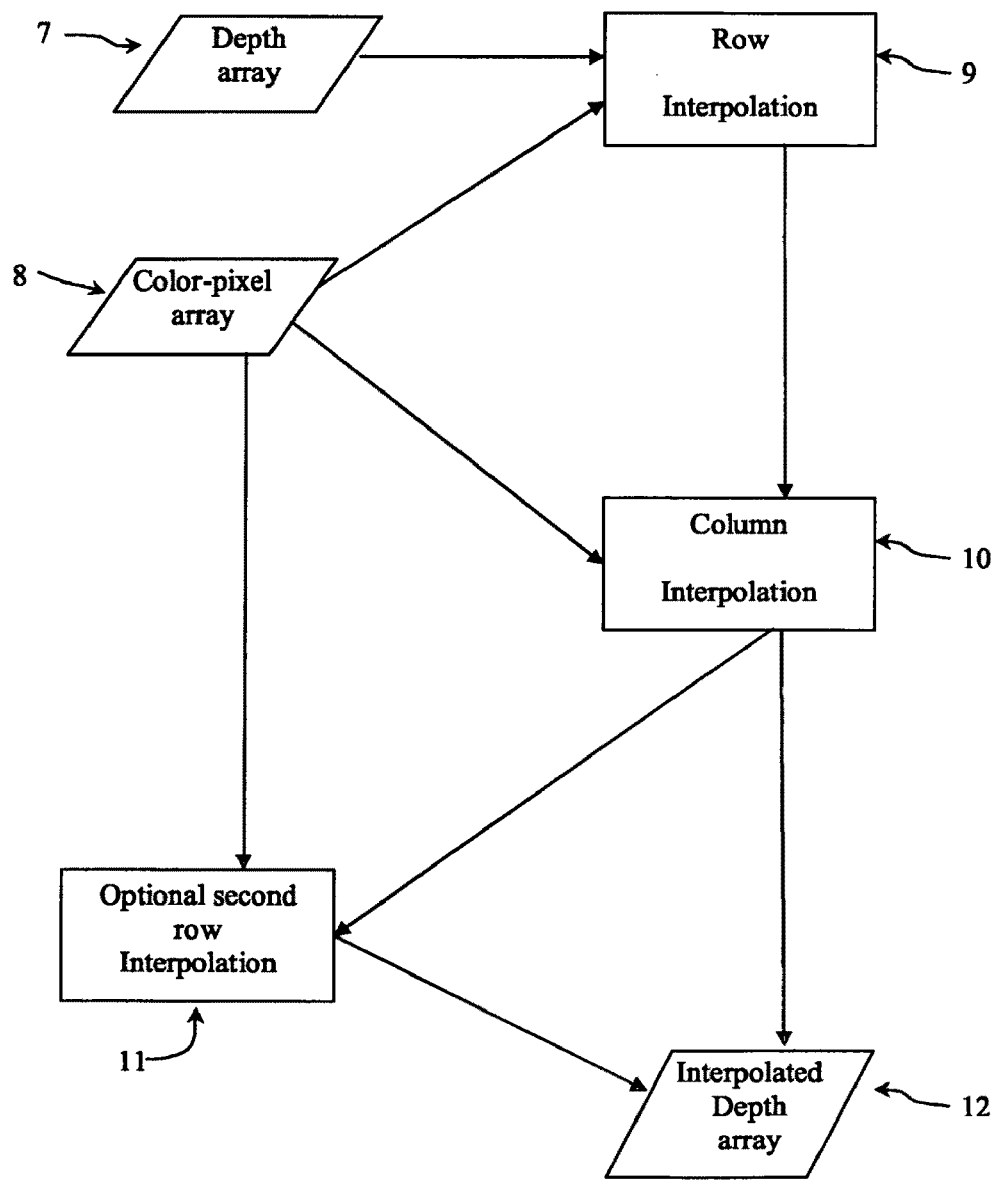

It is a well known problem in the prior art that the depth map provided by depth perception devices may contain errors or missing parts. In fact, by using a stereoscopic camera, it frequently happens that no depth data are computed for low-detail areas of the image. Referring now to FIG. 3, the above-discussed problem of gaps in the depth map is addressed as follows. Once the color pixel array 8 and the depth array 7 are provided, said depth array 7 is scanned row by row and afterwards column by column by executing a row interpolation 9 and a column interpolation 10, and optionally a second row interpolation 11. On each row, all the gaps contained in the depth array 7 are identified. If a gap is shorter than a preset threshold, and if the depth difference between the two sides of the gap is smaller than a preset threshold, the color of the corresponding pixels in the color array 8 is examined. More particularly, in this case the process examines the color of the two pixels on each side of the gap and the color of the pixels inside this gap. If those are almost constant (within some preset tolerance) then the gap in the depth array 7 is filled with depth values. This depth value may be: the (almost) constant one on each side of the gap; their average; or values which are linearly interpolated from the values on both side of the gap. After the process has been completed on all rows, it is done on the columns of the depth array 7; hence values that were initially missing and have been filled in during the horizontal scan, can in turn frame gaps in the vertical direction. The procedure can be carried out in the other order: columns first, then rows; or a third step in the same direction as the initial pass can also be added. At this point it should be noted that, in all cases wherein the depth map refinement process is required and performed, for the clarity of the description we will refer, hereinafter, to the depth array 7 as the interpolated depth array 12 provided at the end of this process.

Figure 4:
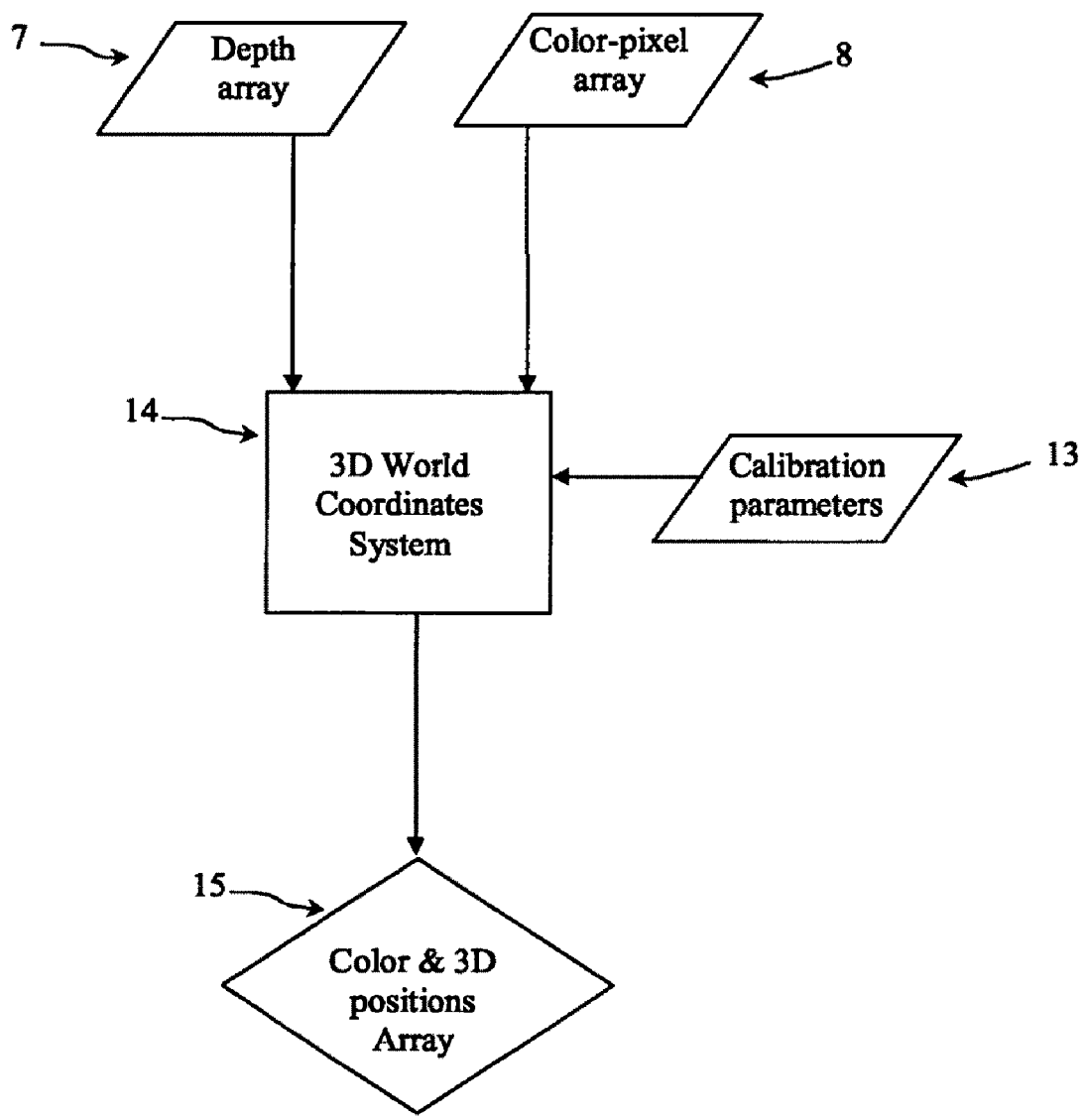

We refer now to FIG. 4. The calibration parameters 13, obtained by the calibration step, are used to compute the coordinate transformations which have to be applied to any new pixel color array 8 and new depth array 7, that are captured by the video camera 4 and the depth perception device 3. This transformation is required to obtain coordinates (X, Y, Z) in a more convenient three-dimensional real-world coordinate system 14, wherein, typically, the Y-axis is the vertical axis and the X- or Z-axis is parallel to a display or a wall of the room. Such a coordinate transformation (R, T) is applied as follows:

$$Z'=z$$

$$X'=(x-cx)/fx$$

$$Y'=(y-cy)/fy$$

where x, y denote the coordinates of the pixel in the color array 8 and the depth array 7; z is the depth value at coordinates x, y; cx and cy are the coordinates of the optical center of the color array 8; fx and fy are the focal lengths of the color array 8 (fx=fy for square pixels); and $$[XYZ]=R[X'Y'Z']+T;$$

where R is the rotation matrix between the video camera 4 and the world coordinate systems and T is the translation between both origins. This coordinate transformation (R, T) is determined by using a calibration object such a planar or non-planar target facing a check board to the camera; or by using the depth perception of the camera in order to compute the mathematical representation of a plan of the scene (usually the floor but it could be a wall of the room) relatively with the camera position and orientation. Finally, the three-dimensional world coordinate system 14 provides a 3D positions and color points array 15. As a consequence, any reference to a pixel (real world coordinate) in the remainder of this document should be understood as the association of an image element of the color pixel array 8 with its position expressed in world coordinates.

Figure 5:
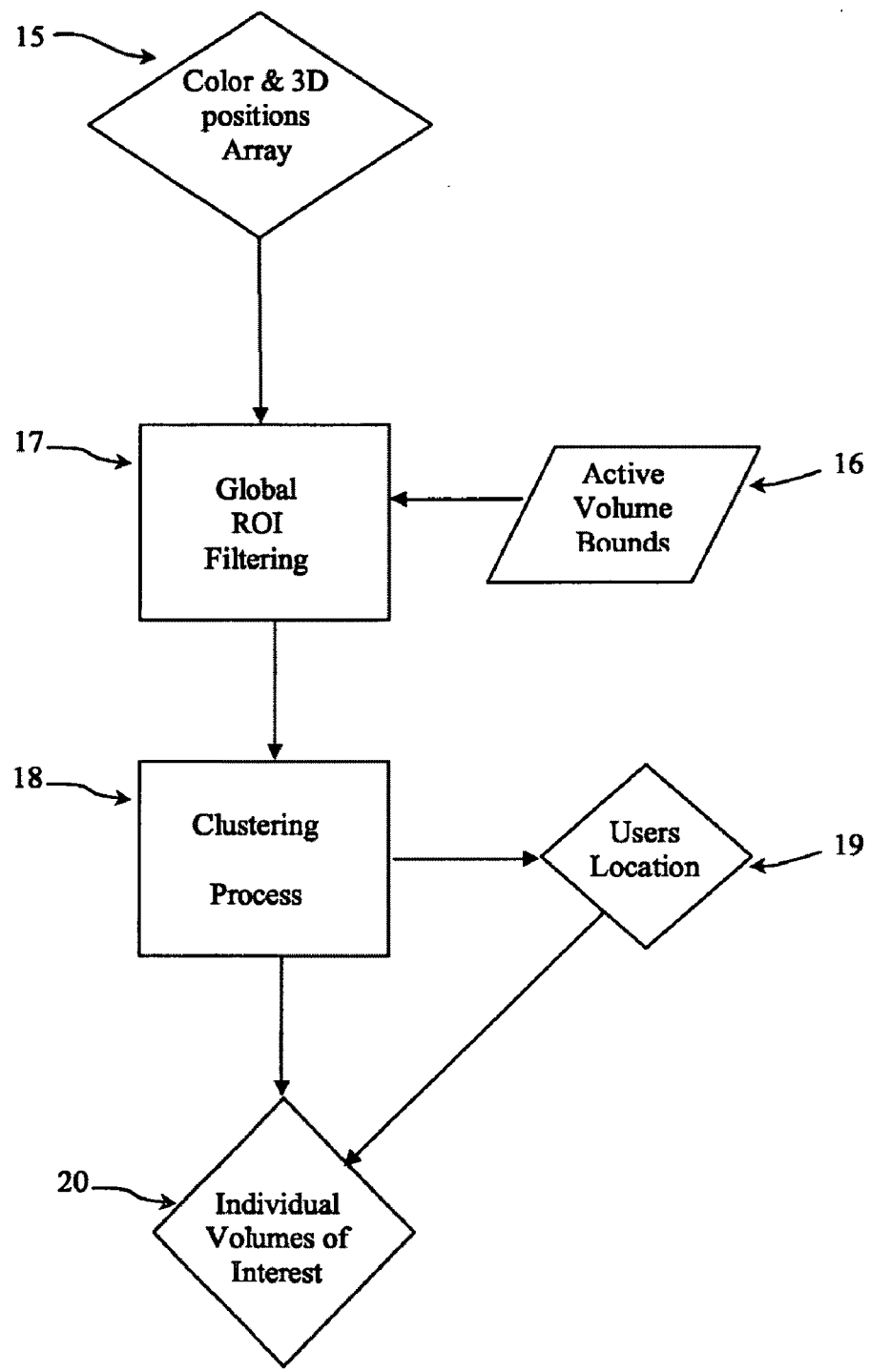
Figure 5A:
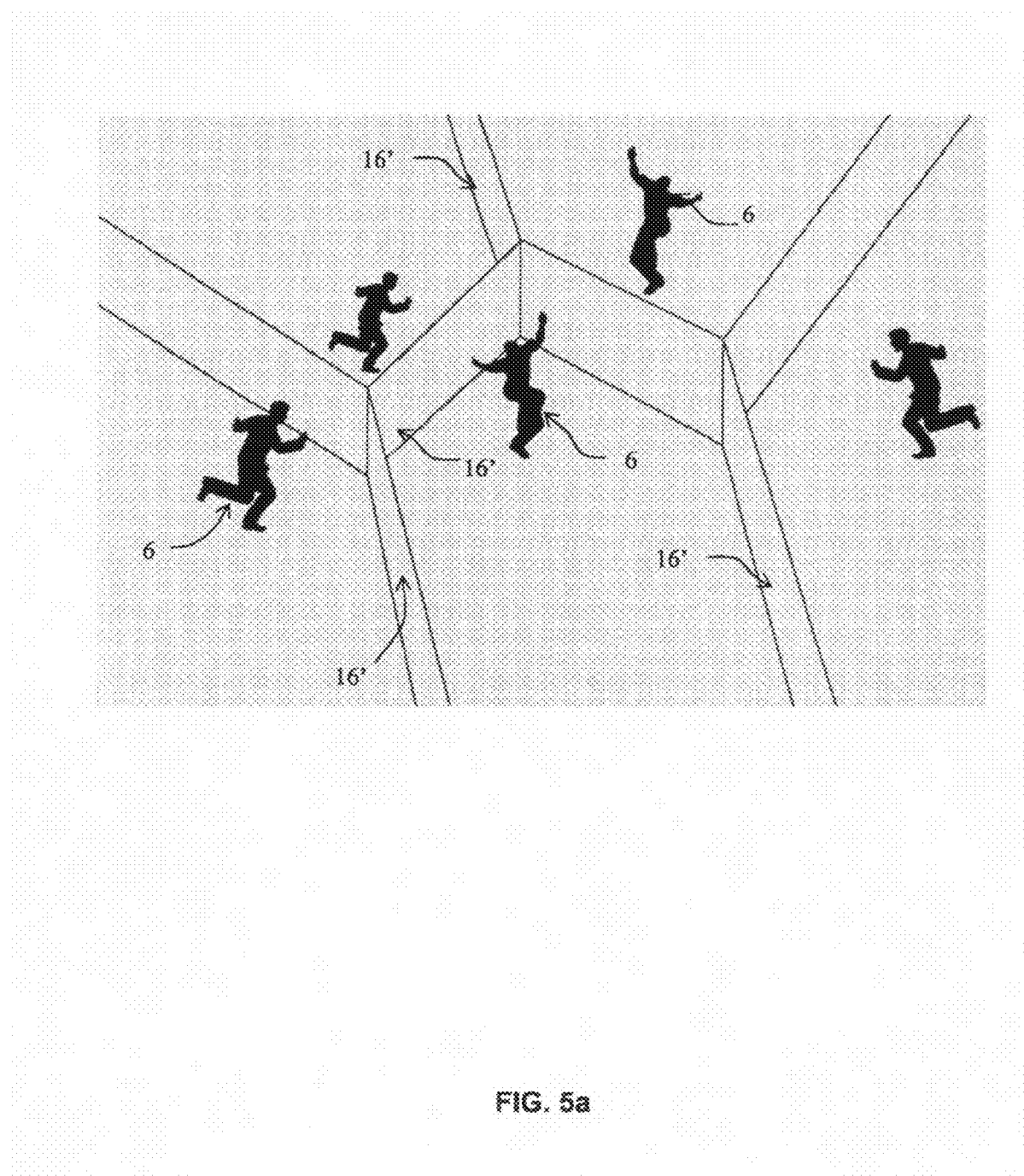
FIG. 5a is a pictorial representation of individual volume of interest bounds, separating multiple users.

FIG. 5 and FIG. 5a show in detail the users separation method according to a preferred embodiment of the present invention. Once the 3D position and color points array 15 is computed, the process for separating users 6 in the scene is performed as follows: active volume bounds 16 are predetermined at the time of the setup. They are virtual 3D frontiers with arbitrary shape that are defined either in order to bound some global regions of interest, outside of which no interaction is possible; or in order to reject some parts of the detected objects, such as walls or furniture. They define the space where users are expected to be interacting with the systems. In the embodiment of FIG. 1 the active volume bounds may conveniently be defined as the cuboid delimited by the vertical and horizontal posts delimiting the scene. Therefore, people outside that space are treated as non-participating spectators and are not detected by the system. Once the active volume bounds are enforced, by means of a Global ROI Filtering 17, a clustering process 18 is performed for establishing each user location 19 in the scene. This is done as follows: the basic principle of this process is the grouping, in a three-dimensional space, of the points contained in the 3D position and color points array 15. The points are grouped (clustered) according to their relative positions, so that each group contains points that are in the same region of space. There are several well-known iterative algorithms capable of achieving this task. For example, the k-means algorithm (J A Hartigan, M A Wong: "A K-Means Clustering Algorithm"—Applied Statistics, 1979); or the Expectabon-Maximization algorithm (A Dempster, N Laird and D Rubin: "Maximum likelihood from incomplete data via the EM algorithm"—Journal of the Royal Statistical Society, Series B, 39(1):1-38, 197); and many other clustering techniques (A K Jain, R C Dubes: "Algorithms for clustering data"—1988—Prentice-Hall, Inc. Upper Saddle River, N.J., USA). Each group (cluster) is usually identified by its center 19 and represents the location of one object or person in the scene. The clustering process 18 further establishes individual volumes of interest 20 corresponding to each user location 19. This can be done as follows: once each group of points has been identified by its center 19, the process establishes median planes with respect to segments linking said centers. These median planes divide up the entire global ROI volume, determining individual volumes of interest 20, separated by individual volumes of interest bounds 16'. By performing this clustering process for successive frames in the acquired data, one can tracks each individual volume of interest 20 as it evolves over time. This can be used for analyzing gestures and behaviors of the corresponding users. An important alternative is when the clustering process 18 uses predefined individual volumes of interest 20 wherein users are supposed to remain. In that case, the number and the shape of the individual volumes of interest 20 are predetermined when the setup is installed.

Figure 5B:
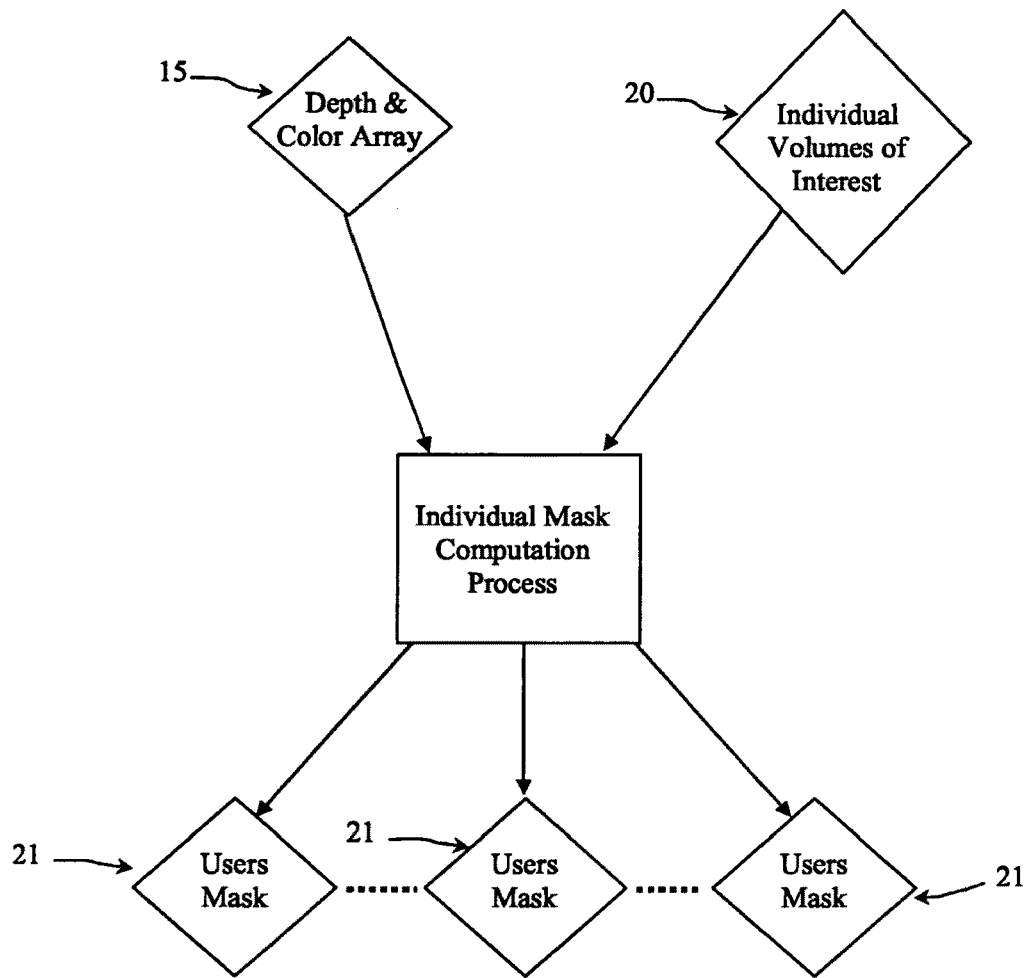

We refer now to FIG. 5b. Given the boundaries of the individual volume of interest 20 and the three-dimensional real-world 3D positions and color points array 15 (computed previously in section [29]), wherein each user has been identified, the individual mask 21 is computed as follows: into the 3D positions and color points array 15, wherein the X, Y, Z 3D coordinates of each pixel in the 3D space are contained, all points that fall inside each individual volume of interest 20 are selected. In the Individual Mask Computation process, one performs a reverse transformation from X, Y, Z point contained in an individual volume of interest 20 in 3D space to x,y pixel elements in the depth array 7 and color pixel array 8. Therefore, the process provides an individual mask 21 which is an array of the same size as the depth array 7 and the color-pixel array 8. More precisely, it is a binary array with 1's at the location of the pixels whose 3D coordinates are contained in the individual volume of interest 20, and 0's elsewhere. The following equation 100 is an example of equation that may be used for determining an individual mask 21 for each user (assuming for example that the volume of interest is a cuboid):

$$\text{mask}=((X>=X\min) \text{ AND } (X<=X\max) (Y>=Y\min) \\ \text{AND } (Y<=Y\max) (Z>=Z\min) \text{ AND } \\ (Z<=Z\max)). \qquad 100$$

Figure 6:
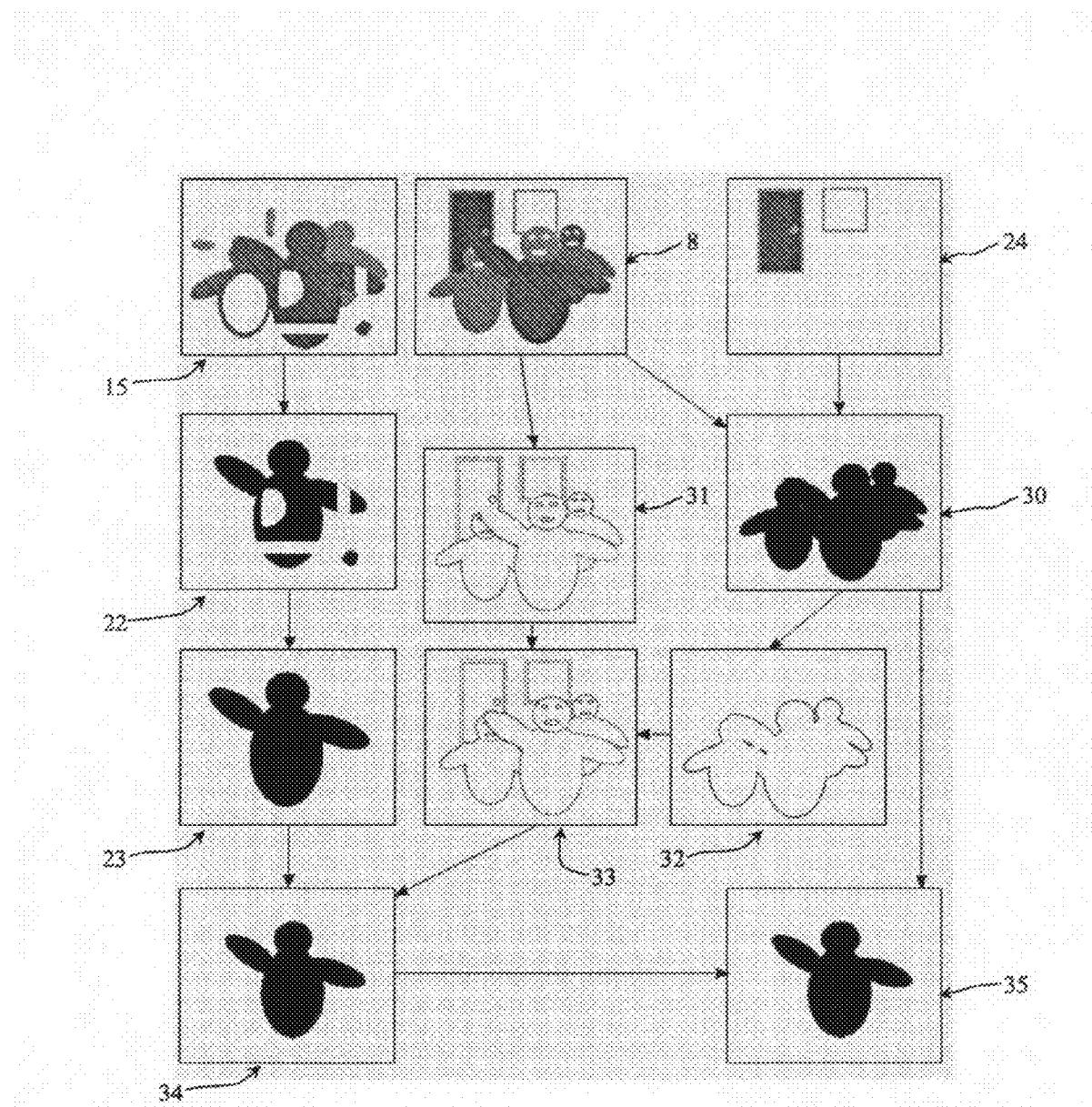
FIG. 6 is a schematic representation illustrating the processing and flow of different data and masks.

We now refer to FIG. 6. When the depth perception device 3 or the registration process provide an image with missing depth values, corresponding to the 3D positions and color points array 15, then the individual mask 21 is an individual mask with missing depth values 22. In that case, the values X, Y and Z of the points corresponding to the missing depth values, are set to a very large conventional value so that the corresponding points are guaranteed to be outside the individual volume of interest 20. The individual mask with missing parts 22 is then processed for obtaining a filled individual mask 23. Consequently, this mask filling process provides a filled individual mask 23 which has some parts with larger than the original image. If the volume of interest is not a cuboid, another appropriate test must be carried out to determine whether each pixel is comprised within the volume of interest or not.

Figure 6A:
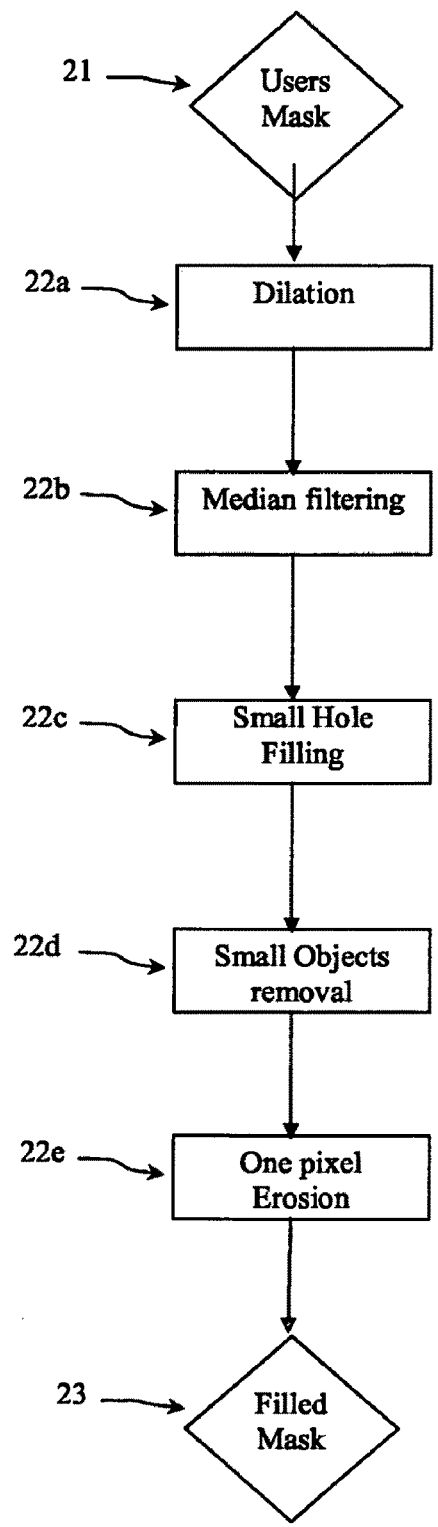

Referring now to FIG. 6a, the accuracy and general quality of the above-discussed mask filling process is additionally improved by the following steps:

1. A morphological dilation 22a with a preset dilatation size is carried out. This is done most effectively by repeating a "one-pixel dilation" D times, where D is the desired total size of the dilation;
2. A median filtering 22b is subsequently applied. This step is executed for: further smoothing the edges of each individual mask 21; and removing very small holes and/or small disconnected segmented regions. The size M of the median filtering window can be adjusted depending on the characteristics of the depth perception method;
3. Small holes filling 22c is applied to the individual mask 21. Said small holes are, in fact, connected un-segmented areas of maximum size H, measured in number of pixels of area, surrounded by segmented regions;
4. Small objects removal 22d is then applied in the individual mask 21. Said small object are, in fact, connected segmented areas of maximum size O, measured in number of pixels of area, surrounded by un-segmented regions;

5. A morphological erosion process 22e of a preset size is also carried out. This is obtained by repeating "one-pixel" erosion" E times, where E is the desired total size of the erosion.

Steps 3 and 4 can be realized by labeling and computing the area of all the disconnected regions in the individual mask 21 (for step 4), or on its negative (for step 3), then by filling all said regions below the size limit O or H with "1" (for step 4) or "0" (for step 3).

Once the mask filling process is ended, as already mentioned, the filled mask 23 has some parts with larger dimension in contrast with the previous individual mask 21. Evidently, said filled mask 23 must be treated for having the same size as the individual mask 21. The mathematical morphology erosion tool is a well-known technique for reducing the size of a binary image mask while preserving its shape, by removing a constant number of pixels along the edge of the mask. However, that technique is not applicable in this case because the border that should be removed does not have a constant thickness: in some parts of the image, for example, the edge of the mask follows closely the actual object boundary, while in other parts it is significantly outside the actual object boundary. A standard erosion technique would either leave too wide a mask in some areas, or cut inside the object in other areas. The present invention uses a multi-step erosion technique that stops at the edge of the object to be segmented. This multi-step technique requires, in particular, the background-based segmentation process, not yet described. In order to facilitate the comprehension of the description, we discuss at first, in the following section, the background-based segmentation and continue, later in section [064], the multi-step erosion technique description.

Figure 7:
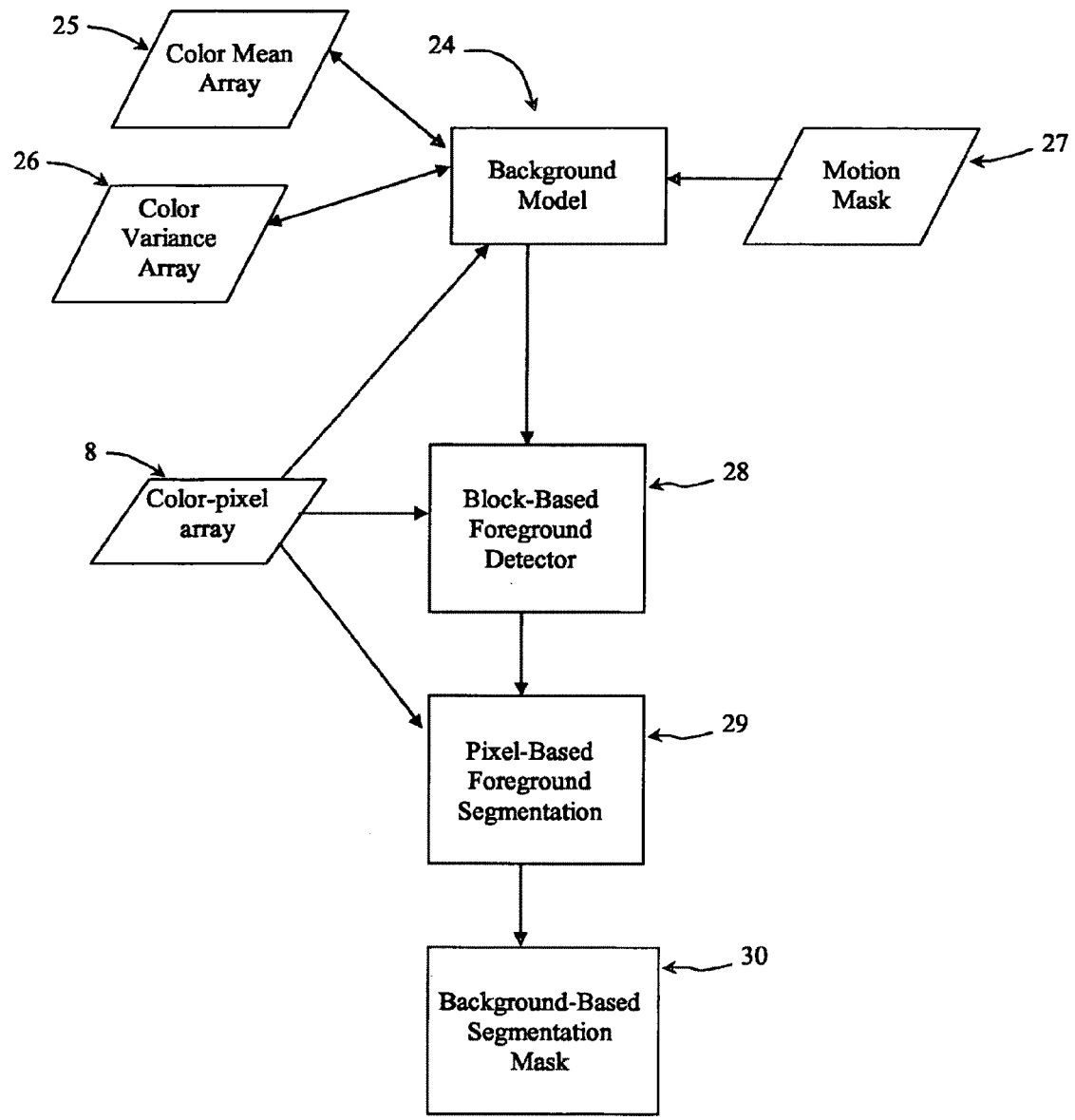

FIG. 7 shows the background-based segmentation process of an image that can be used in the invention. This process is used for separating foreground objects from background objects by analyzing color pixel arrays 8 captured by the video camera 4. This process aims to build and maintain an adaptive background model 24 by updating regularly its color mean array 25 and its color variance array 26 by means of a motion mask 27. Said motion mask 27 gives, in fact, the portion of the image where the background model 24 can be updated for each frame of the images captured by the video camera 4. The background-based segmentation process is realized as follows:

The motion of objects in the scene is detected by subtracting two successive images followed by a thresholding. Pixels in movement are accumulated in a binary buffer over a predetermined period of time. During the same period of time, the successive images of the video flow are also accumulated in order to compute the average image and the variance image over this interval. The accumulated binary image establishes whether each pixel has moved during the period of time or not. Used as a mask, the background model 24 can be partially updated by means of the color mean array 25 and the color variance array 26 computed over the same period of time;

In order to detect shadows on the background, an algorithm computes a block-based linear monotone regression for providing a sort of block-based foreground detector 28. This algorithm assumes that a shadowed portion of the background keeps its physical structure while the ranking of intensity of pixels between shadowed block x and a non-shadowed block x' is preserved (if pixel P is darker than pixel Q in shadowed block x, then pixel P is darker than pixel Q in non-shadowed block x'). For example, the monotone regression can be a linear regression that follows a linear (x'=ax+b) law. Other parametric laws that express x' as a monotone function of x can be used. The statistical information computed by block classifies each block as a foreground or a background one. In the special case where an edge of the foreground is crossing a block, the fraction of background pixels inside the block is removed using the shadow model of background block in its neighborhood;

Given the background model 24 and the color pixel array 8, the segmentation decision is taken using a pixel-based Gaussian thresholding of a pixel x as following:

$$(x-\mu)^2 < \beta * var;$$

where: $\mu$ and var are, respectively, the model mean and the model variance, both adapted with the linear regression of the shadow model; and $\beta$ is the variable threshold. A pixel which fulfils the above condition is considered as belonging to the background, otherwise it belongs to the foreground and consequently, it is segmented from the raw image, providing pixel-based foreground segmentation 29.

At the end of the above described steps, a background-based segmentation mask 30 is obtained. It should be noted that in order to improve said process, some well-know morphological operations (dilation, erosion, closing, opening, . . . ), as well as hole filling and noise removing techniques are used as described previously in section [058].

Figure 8:
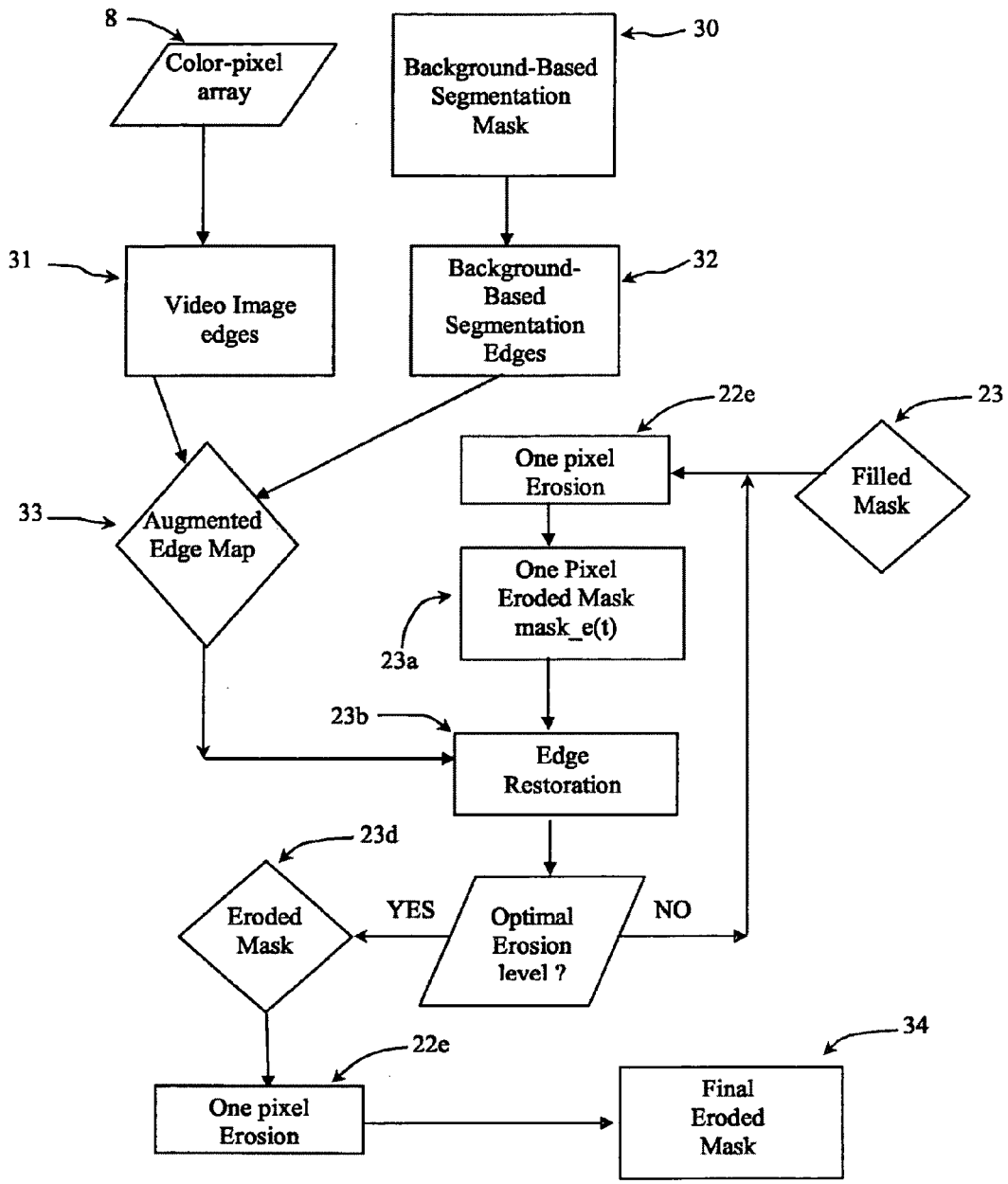

We refer now to FIG. 6 and FIG. 8 wherein the multi-step erosion process is illustrated. Said process is performed as follows:

1. By means of standard techniques, such as the Canny edge detector, video image edges 31 are detected from the color pixel array 8. Background-based segmentation mask edges 32 are, instead, computed by using, for example, the following formula:

$$EB:=\text{backseg AND (NOT erosion(backseg))};$$

where "backseg" refers to the background-based segmentation mask 30 and "erosion(backseg)" refers to a "one-pixel" morphological erosion of the background-based segmentation mask 30. By applying the logical operator OR to the video image edges 31 and the background-based segmentation mask edges 32, an (augmented) edge map 33 is obtained. This result is, in fact, a binary map of the same size as the background-based segmentation mask 30 and the color pixel array 8. Edges are represented by '1' pixels, non-edges by '0' pixels;

2. A "one-pixel" erosion 22e is performed on the filled mask 23 for obtaining a one-pixel eroded mask 23a, mask_e(t), where t is the counter in the iteration loop:

$$\text{mask\_e}(t) = \text{OnePixelErosion(mask}(t-1))$$

3. Said one-pixel eroded mask 23a is then corrected according to the following formula for performing an edge restoration process 23b:

$$\text{mask}(t) = \text{mask\_e}(t) \text{ OR ((NOT mask\_e}(t)) \text{ AND mask}(t-1) \text{ AND edge)}$$

The logical operation OR operates on all the binary values of the filled mask 23 and of the edge map 33 in parallel. Mask(t) represents one-pixel eroded mask 23a, Mask(t−1) represents the filled mask 23 before erosion, and edge is the (augmented) edge map 33. The result of this operation is an eroded mask 23d if the mask locations where an image edge has been detected have not been set to '0';

4. Steps 2 and 3 are repeated A times, where A is a preset parameter that is the maximum number of pixels that should be removed from the border of the filled mask 23 in order to provide an optimal erosion level 23c;

5. A final "one-pixel" erosion 22e is performed on the eroded mask 23d in order to remove spurious pixel-wide structures that have been created by step 3. The result is a final eroded mask 34.

Hence, the background-based segmentation mask 30 and the final eroded mask 34 are combined via a logical operation in order to obtain a final mask 35 as follows:

final mask=mask AND backseg;

which means that the final mask 35 consists of those pixels that are segmented as foreground objects by both the background-based segmentation mask 30 and the final eroded mask 34.

The following adaptive variation could also be applied during step 3 of the erosion process above-described:

$E_b$=mask_$e(t)$ OR ((NOT mask_$e(t)$) AND mask($t$−1))

$N_b$=mask_$e(t)$ OR ((NOT mask_$e(t)$) AND mask($t$−1) AND edge)

wherein: $E_b$ is a binary map that shows all the mask pixels that would be set to zero by regular erosion; $N_b$ is a binary map that shows all the mask pixels that would be set to zero by regular erosion, but are located on an image edge, and therefore, will remain at one; and t is the number of the iteration. The maps $E_b$ and $N_b$ are divided in non-overlapping blocks of a preset size. Within each block, and at each iteration, the number of values of $E_b$ and $N_b$ found equal to '1' are counted (that can be done efficiently by summing all mask values within the block) to yield the numbers $\Sigma E_{bi}(t)$ and $\Sigma N_{bi}(t)$, respectively. For each block i, those two values and their ratio are compared to the values computed at the previous iterations $\Sigma E_{bi}(1)$ through $\Sigma E_{bi}(t-1)$ and $\Sigma N_{bi}(1)$ through $\Sigma N_{bi}(t-1)$. The $\Sigma N_{bi}$ values usually increase and become closer to the $\Sigma E_{bi}$ values. By monitoring the evolution over the sequences $\Sigma N_{bi}(t)$ and $\Sigma E_{bi}(t)$ within block i, one can detect when the adaptive erosion has reached the edge of the object in the region of the image covered by block i. When that happens, the iteration is stopped for that block. That can be done simply by carrying out steps 2-3 on the entire image as above-discussed in section [061], then by copying the previous values of the mask to the new mask within every block for which iterations have stopped. The value of A (section [062]), D, M, H, E and O (section [058]), are chosen together to obtain a segmentation mask that closely follows the borders of the objects being segmented.

Figure 9:
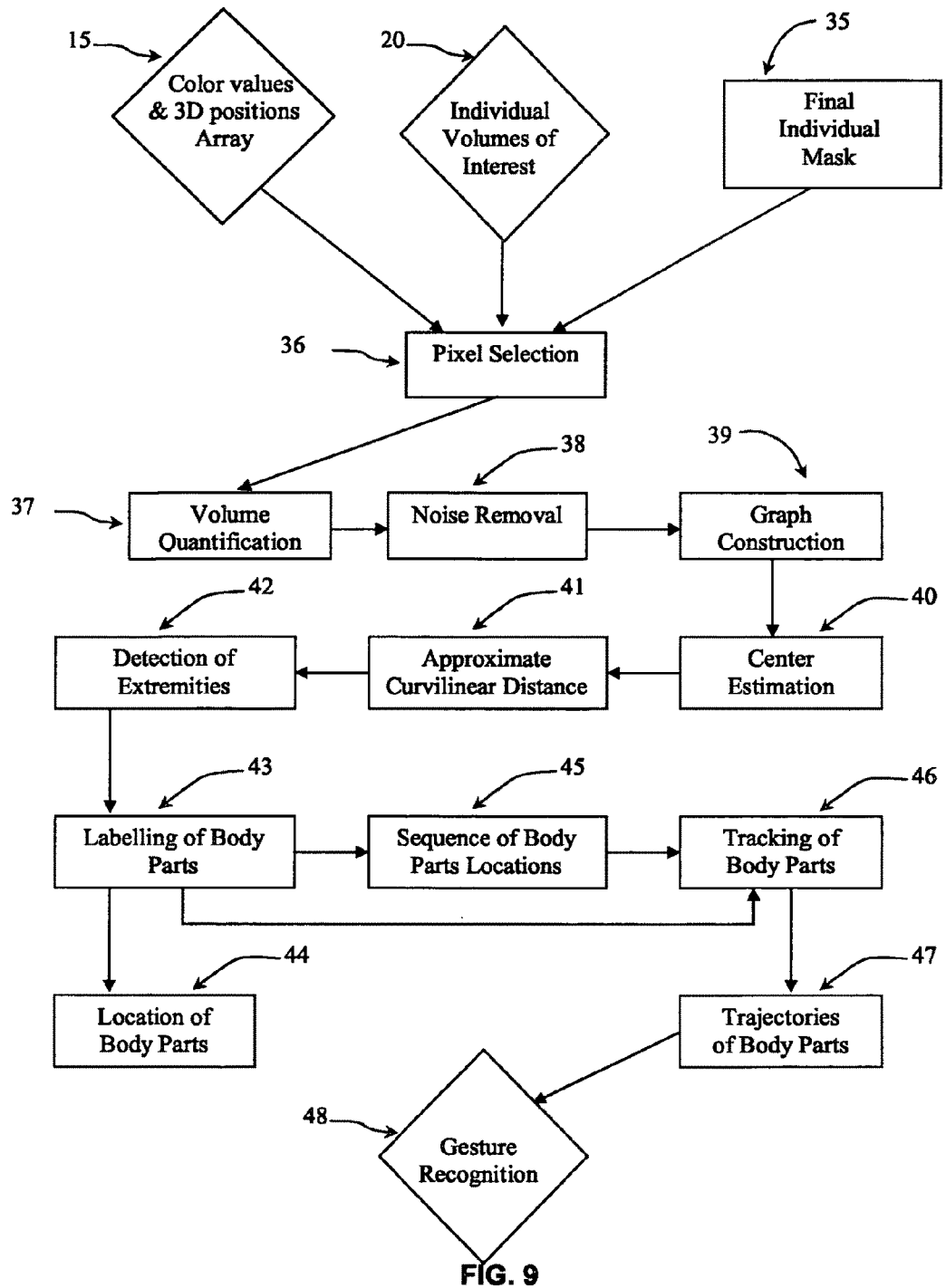
Figure 9A:
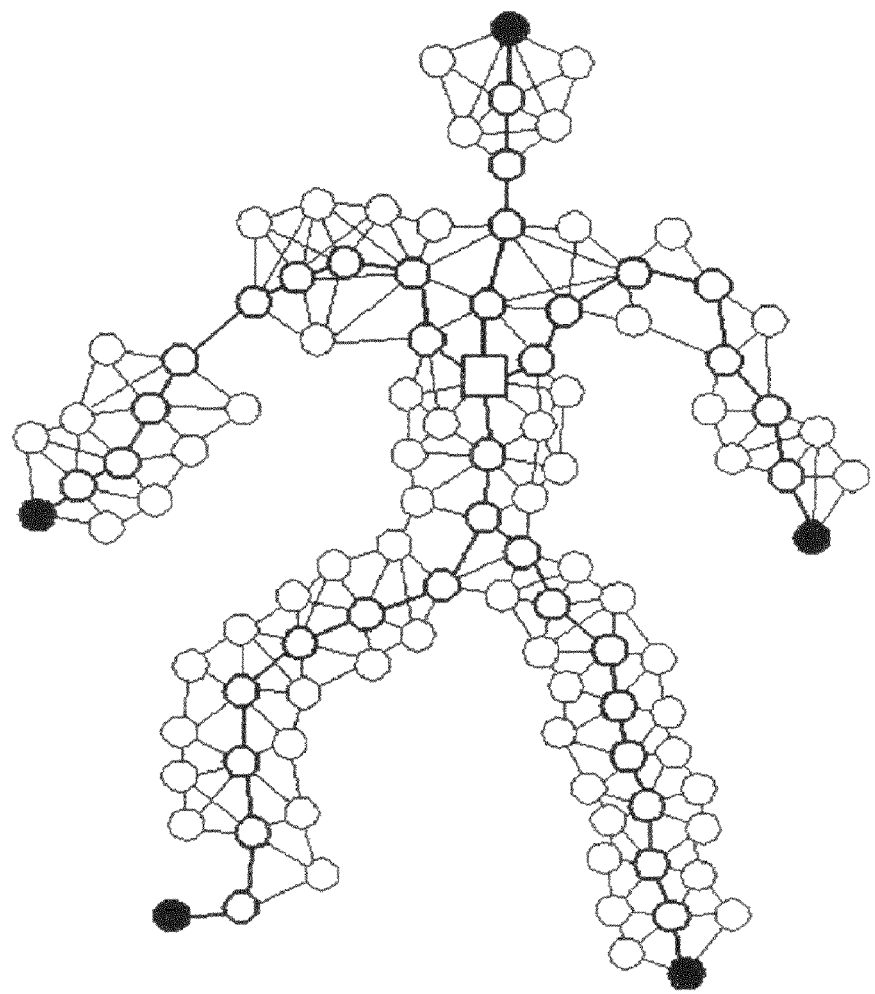
FIG. 9a is a schematic data representation used in body pose recognition.

FIG. 9 and FIG. 9a show the process for body pose recognition as well as arms and legs detection and tracking. The limbs position detection process comprises the following steps:

1. (Quantization) The individual volume of interest 20 where each user is located is divided in small elementary volumes (for example cubes) of pre-determined size. The size of the elementary volumes should be comprised between a few centimeters and about 10 centimeters. The size of the elementary volume will determine the trade-off between speed and accuracy in the detection of the limbs. Each pixel of the final mask 35 is allocated to one elementary volume by means of its X, Y, and Z real-world coordinates of the 3D positions and color points array 15. Within each elementary volume, the process performs a pixel selection 36, wherein the number of pixels is counted. If within said elementary volume there is at least one pixel, either the center of gravity (average pixel position) or, alternatively, the center of the elementary volume of the set of pixels is computed. Therefore, the elementary volumes that do not hold any pixel are discarded, establishing volume quantification 37. It should be noted that the elementary volumes can be defined in many ways, for example by a uniform grid of cubes, or by setting the centers of the elementary volumes as a subset of all pixels (randomly determined or not) or alternatively, a clustering procedure, like the well-known k-means algorithm, can be performed to find the centers of the elementary volumes. In these two variants, it may not be necessary to refer to elementary volumes or cubes at all, as the centers of them represent the only information used in the following steps. We refer to cubes in the steps below for the sake of simplicity;

2. (Noise removal—optional)The cubes that contain less than a preset number of pixels are discarded. Additionally, and optionally, the cubes that only have empty neighbors are discarded (regardless of the number of pixels they contain) in order to perform a noise removal 38 within each volume. The neighborhood of a cube on a uniform grid is defined either as the 6 cubes that have one facet in common with the cube, or as the 18 cubes that have at least one edge in common with it, or as the 26 cubes that have at least one corner in common with it. If the cubes are not on a uniform grid (as above-described), the neighborhood is defined as a sphere of given radius;

3. (Graph construction) For the clarity of the following description we also refer now to FIG. 9a, wherein, as indicated in the legend, the square symbol represents a source node; thin empty circles represent nodes; thick empty circles represent nodes on the best path from the source node to extremities; full circles represent extremities; thin straight line represent edges; and thick straight line represent edges on the best path weight. A weighted non-oriented graph 39 is constructed from the remaining cubes. Each cube is then represented as a node, and weighted edges connect nodes that represent cubes that are located within a preset distance from each other. Distance between cubes is computed by using the center of gravity of the pixels they contain, or their geometrical center. The weight of the edge is set to the Euclidian distance between the cubes. We denote w (u, v) the weight of the edge between node u and node v. Optionally, links that would have a weight larger than a preset value are not inserted in the graph;

4. (Center estimation) This process step aims to perform center estimation 40 among the cubes making part of the weighted non-oriented graph 39. On the one hand the cube that is closest to the center of gravity of all pixels or all cubes is then found and named "source cube"; on the other hand the corresponding node in the graph is named the source node;

5. (Fast approximate curvilinear distance computation) A special best path weight is computed in order to obtain an approximate curvilinear distance 41 from the source nodes to all nodes in the graph 39. This best path weight is defined as the minimum of path weights over all the paths which are connecting the source node to an extremity (target node). The weight of a path is obtained by raising the edge weights to a given power p, then summing all these raised weights for all edges comprised in the path. This is not the conventional definition of the weight of a path in a graph, which would be a sum of weights, instead of a sum of weights raised to a power. The power to which the weights are raised, denoted p hereinafter, should be larger than one in order to penalize the large weights more than they would be if a plain sum were used. This feature is critical to ensure that the best path follows the surface of the 3D volume by making small "local" hops, rather than jumping straight from the source node to the extremity (target node). The procedure used to compute the minimum weight from the source node to all nodes, and record additional information about the minimum weight path is detailed below. The additional recorded information is the sum of link weights along the best path, which is an approximation of the curvilinear distance, and it is used in the next step. The procedure is similar to the well-known Dijkstra algorithm, but modified to handle the non-conventional path weight definition, and the additional information to be recorded. The nodes of the graph are contained in two sets: S and F. W(n) is the best weight (sum of link weights raised to the power p), so far found to reach node n from the source node; H(n) is the number of hops of the best path so far found from the source node to node n; D(n) is the sum of link weights along the best path so far found from the source node to node n; B(n) is the identifier of the node that is immediately before node n on the best path from the source node. Initially, set S contains all nodes, and set F is empty. For all nodes, except the source node, W(n) is set to +∞, and W (source node) is set to zero. An iterative procedure is subsequently carried out:

a) Picking the node u from S that has the smallest W(u) and moving it to F. The source node is the first node to be selected;

b) Performing, for each node v that has a connection with node u, the following test:

$$W(v) > W(u) + W(u,v)^p?;$$

if it is true, the following operations are carried out:

$$W(v) = W(u) + w(u,v)^p;$$

$$H(v) = H(u) + 1;$$

$$D(v) = D(u) + w(u,v);$$

$$B(v) = u;$$

c) Going back to step a) until S is empty.

At the end of the process, D (v) holds an approximation of the curvilinear distance from the source node, for all nodes that are connected to it;

6. For all nodes u, check whether D (u) is greater or equal to D (v) for all nodes v connected to u. If it is the case, u is marked as an extremity and the extremity detection 42 is then performed;

7. The body parts labeling step 43 is performed, wherein i.e. the extremities detected in previous step are labeled as the head, the left hand, the right hand, the left foot and the right foot. This step provides the body parts location 44 for each user. If, for example, the participant is standing up, the extremity that is in higher elevation and is within a certain horizontal distance of the center of gravity of the set of pixels is labeled as the head. Next, one or two hands are identified as the one or two extremities that are in the upper half of the height of the body, as defined by the location of the head arms and hands in resting position may not be detected. Finally, one or two feet are identified as the one or two extremities that are in the lower half of the height of the body. Similar rules may be devised if the person is sitting, crouching, or lying down. Other body parts can be identified by a similar technique. For example, the position of knee can be obtained by backtracking a certain distance along the best path from the source node to the node that has been previously labeled as a foot, using the information contained in D(u) and B(v). The distance measured along the path (the linear sum of weights) should be a fixed fraction of the Euclidian distance between head and foot, or of the height of the head relative to floor level. If there are several extremities that fulfill the conditions described above (for example because of errors in the depth map, bulky clothing, other objects mistakenly included in the region of interest), and therefore labeling is ambiguous, pattern recognition techniques can be used for identifying body parts. An image block around the candidate location of the body part (expressed in image coordinates) is extracted and matched against stored models or templates of the image body part. The candidate that obtains the best match obtains the labeling. A well known technique to perform such an image classification is described in "Rapid Object Detection Using a Boosted Cascade of Simple Features" by Paul Viola, Michael Jones in Proceedings IEEE Conf. on Computer Vision and Pattern Recognition (2001), although many others are available;

8. For each incoming image and associated depth map, steps 1 to 7 are carried out in order to obtain a sequence of body parts locations 45. A body parts tracking process 46 ensures that the locations of the head, hands, feet and other body parts are consistent in the sequences of body parts locations 45. This problem has been extensively studied in the scientific literature, and an early example is "An algorithm for tracking multiple targets" by D. Reid in EEE Transactions on Automatic Control, 1979. This tracking process 46 is also used for recording the trajectories of the body parts 47 over time, which are used in the next step;

9. (Gesture recognition)The sequence of head, hand and/or feet positions over time is used to derive velocity and acceleration estimates. These sequences of numbers are used as input of multiple hidden Markov model classifiers that have been statistically trained for the gesture recognition 48. More details of this well known technique can be found in "Parametric hidden Markov models for gesture recognition" by Wilson, A. D and Bobick, A. F in IEEE Transactions on Pattern Analysis and Machine Intelligence, Volume 21, Issue 9, Date: September 1999, Pages: 884-900.

Figure 10:
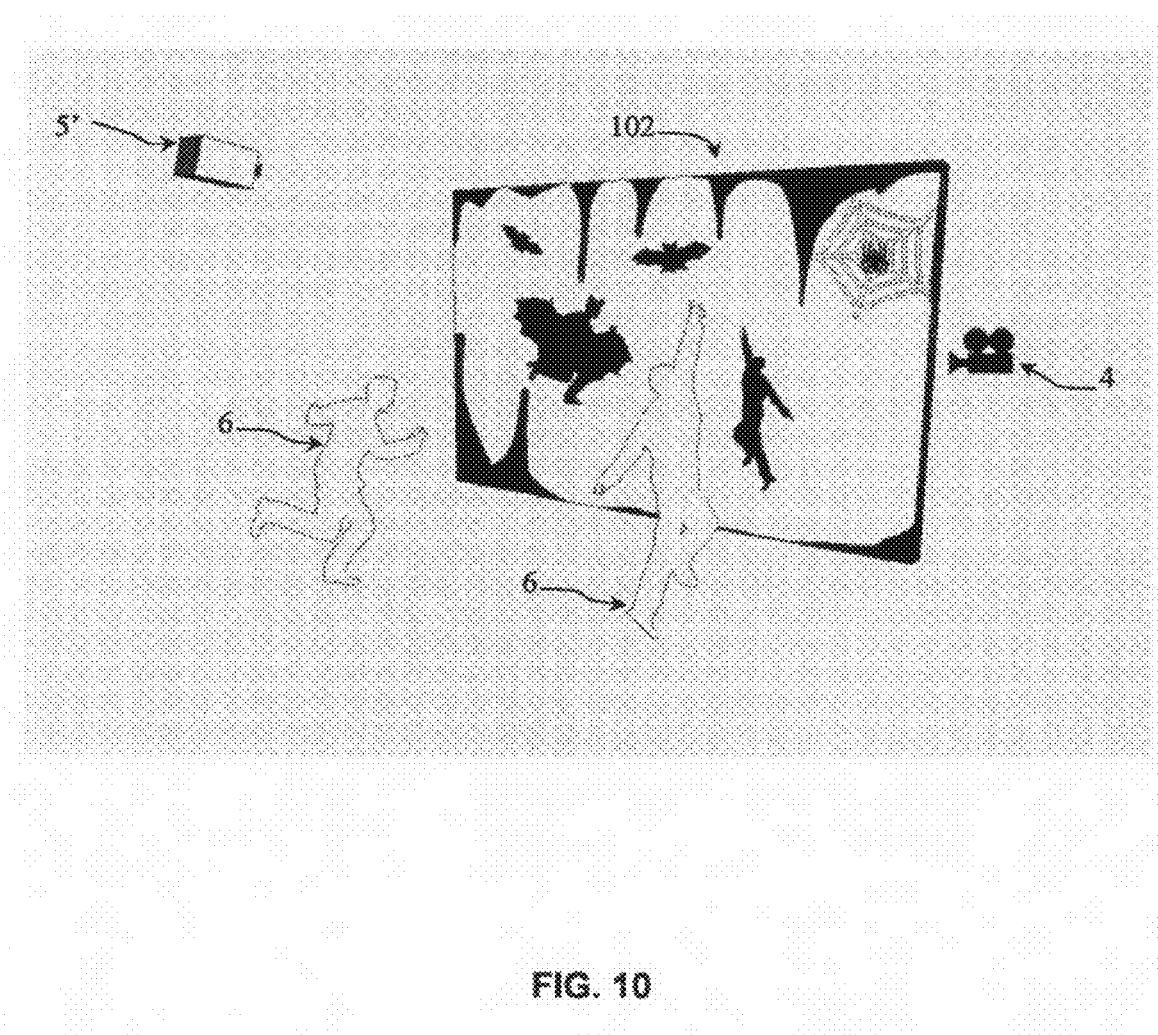
FIGS. 10 and 11 are pictorial representations of two embodiments of devices according to the invention.

A particular embodiment according to the invention is shown in FIG. 10 wherein the image captured by the video camera 4 is displayed on a screen 102 by a projector 5'. The projector 5' may be located near the camera 4, hence creating a mirror-like effect. The location of users or objects in 3D space is used to modify the scene in a highly realistic way, by modifying existing elements or inserting virtual elements in the scene. Some users, for example, may be replaced by imaginary characters, or may wear different clothes than in reality, or may have their appearance transformed. Additional characters or objects are inserted in the scene and move or behave according to the users' movements and gestures. Because the positions of the elements of the scene are known in three-dimensions, special effects can be realized with the correct perspective effect and occlusions. This application is called the "magic mirror".

Figure 11:
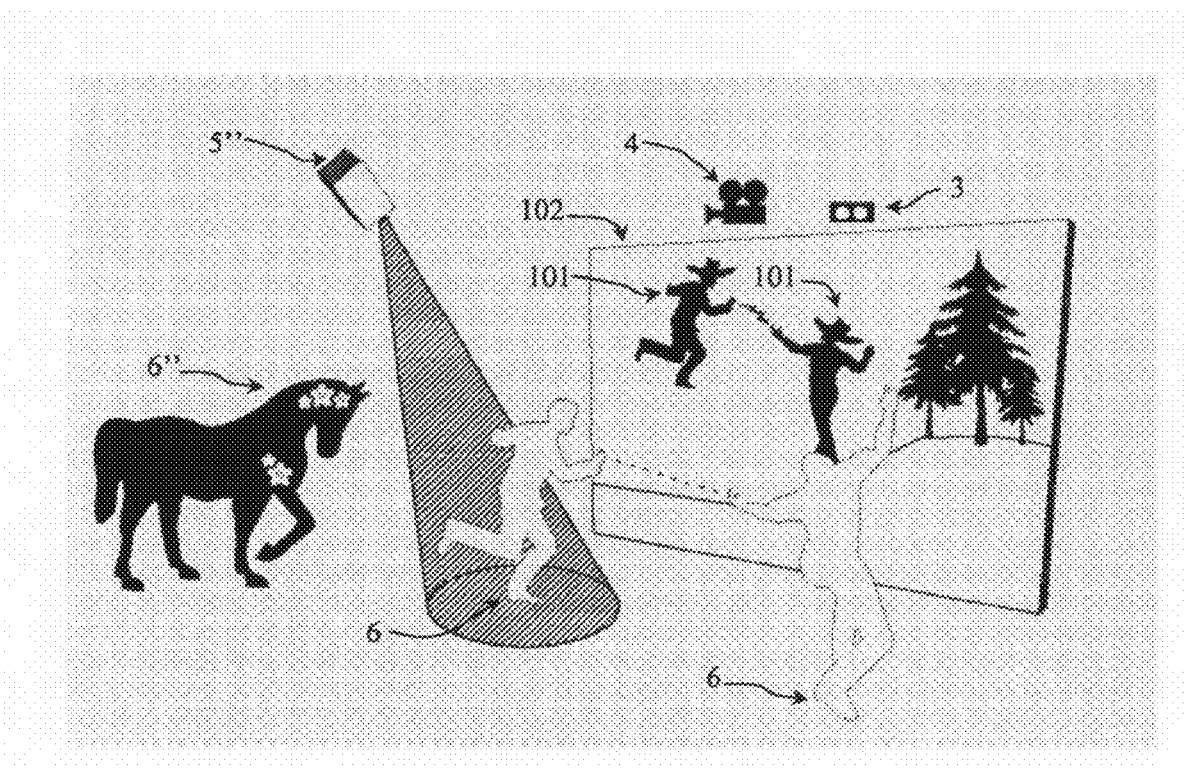

Another particular embodiment according to the invention is shown in FIG. 11, wherein the locations of all participants 6 in 3D space are used to direct one or more tracking lights 5". One objective in a game can be to follow a light or alternatively to escape a light beam. The participants 6 point towards each other either in order to establish links (e.g. teams in a game) or to pass a virtual object to another or to send the tracking light towards the participant 6 pointed at. As the participants 6 move around the room and they are tracked by the system, an avatar 101 moves accordingly in the virtual world that is projected on one or more displays 102. The avatars 101 may replicate the body pose and gestures made by the users 6, or transform them in some way (e.g. exaggerated). The avatars 101 may be pure synthetic figures, or they may be composed from the image, or part of the image (e.g. just the head), of the participants 6 captured by the video camera 4. Their image may be used unaltered, or may be transformed in several ways depending on the theme of the setup, or on the way the game unfolds. If the avatars 101 are synthetic figures, they could be given with the skin color, or hair color, or clothes color of the participant 6. Depending on the location and the gestures made by participants 6, real world elements react: the floor shifts, and physical objects 6" in the room move or activate in some way, animatronics figures move and talk, etc.

Using this invention, a voting system may be set up. Several participants can point at various items on a display showing selectable objects such as pictures of several persons, or other choices. The users can also be directed to execute specific gestures (hands up or other) in response to an item displayed by the system. The items can be sorted and displayed by increasing/decreasing popularity according to the users that have voted so far. Optionally, the pictures of the users that have voted for/against a given item can be displayed next to it. Instead of voting, the pointing gestures can be used to buy/sell items in a virtual market place or exchange.

In another variant of this embodiment, several users control a game through their body poses. For example, they can lean left/right to control objects such as a skate-board, or a bike, or a free fall/parachute. Therefore, the users' images are inserted in the game display 102 and the latter simulates the image taken by the video camera that follows the players through the streets or in their parachute fall.

The invention claimed is:

1. A device for identifying and extracting images of multiple users in an interactive environment scene comprising:
   a video camera for capturing an image from the scene;
   a depth perception device for providing depth information about said scene;
   at least one computer processor for processing said depth information and said image information, wherein:
   said device comprises means for using individual volume of interest from said scene for each user;
   said video camera comprises means for obtaining an image of said scene in a form of a corresponding array of pixel values;
   said depth perception device comprises means for obtaining a depth map of said scene, said depth map and said image being registered to one another;
   said at least one computer processor comprises means for coordinate transforming said depth map and said image to obtain a corresponding array of points containing 3D positions in a real-world coordinates system and pixel values at said 3D positions;
   said at least one computer processor also comprises means for grouping said points according to their relative positions, by using a clustering process so that each group contains points that are in a same region of space and correspond to a respective user location;
   said at least one computer processor further comprises means for defining individual volumes of interest, each volume of interest corresponding to one of said user locations;
   said means for using said individual volumes of interest comprises means for selecting, from said array of points containing the 3D positions and pixel values, the points located in said volumes of interest for obtaining segmentation masks for each user; and
   said means for using said individual volumes of interest further comprises means for applying said segmentation masks to said image for extracting images of said users.

2. A device for identifying and extracting images of multiple users in an interactive environment scene comprising:
   means for obtaining a depth map of a scene in a form of an array of depth values, and an image of said scene in a form of a corresponding array of pixel values, said depth map and said image being registered to one another,
   means for coordinate transforming said depth map and said image to obtain a corresponding array of points containing 3D positions in a real-world coordinates system and pixel values at said 3D positions;
   means for grouping said points according to their relative positions, by using a clustering process so that each group contains points that are in a same region of space and correspond to a respective user location;
   means for defining individual volumes of interest, each volume of interest corresponding to one of said user locations;
   means for selecting, from said array of points containing the 3D positions and pixel values, the points located in said volumes of interest for obtaining segmentation masks for each user, and
   means for applying said segmentation masks to said image for extracting images of said users.

* * * * *